US007281032B2

(12) United States Patent
Kodama

(10) Patent No.: US 7,281,032 B2
(45) Date of Patent: *Oct. 9, 2007

(54) FILE SHARING SYSTEM WITH DATA MIRRORING BY STORAGE SYSTEMS

(75) Inventor: Shoji Kodama, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 692 days.

This patent is subject to a terminal disclaimer.

(21) Appl. No.: 09/905,337

(22) Filed: Jul. 13, 2001

(65) Prior Publication Data

US 2002/0010762 A1 Jan. 24, 2002

Related U.S. Application Data

(63) Continuation-in-part of application No. 09/815,494, filed on Mar. 21, 2001, now Pat. No. 6,542,962, and a continuation-in-part of application No. 09/606,403, filed on Jun. 30, 2000, now Pat. No. 7,188,157.

(51) Int. Cl.
*G06F 15/16* (2006.01)
*G06F 15/167* (2006.01)
*G06F 17/30* (2006.01)

(52) U.S. Cl. .................. 709/217; 709/208; 709/214; 707/204

(58) Field of Classification Search ................ 709/208, 709/217–219, 224, 214; 707/8, 10, 200–201, 707/204; 711/114
See application file for complete search history.

(56) References Cited

U.S. PATENT DOCUMENTS 4,802,164 A   1/1989  Fukuoka et al.
4,837,680 A   6/1989  Crockett et al.
5,155,845 A  10/1992  Beal et al.
5,680,574 A  10/1997  Yamamoto et al.
5,774,660 A * 6/1998  Brendel et al. ............. 709/201
5,781,908 A   7/1998  Williams et al.
5,841,980 A  11/1998  Waters et al.

(Continued)

FOREIGN PATENT DOCUMENTS

AU            200071970 A  *  8/2001

OTHER PUBLICATIONS

*Microsoft Computer Dictionary*, 5th edition p. 437 (2002).

*Primary Examiner*—Andrew Caldwell
*Assistant Examiner*—Douglas Blair
(74) *Attorney, Agent, or Firm*—Townsend and Townsend and Crew LLP

(57) ABSTRACT

A system for optimizing data access is provided. The system includes a cluster file system server, a number of cluster file system clients, and a storage system. The storage system includes disk drives organized as paired master disk drive and one or more mirrored disk drives having copies of the data stored on the master disk drive. When a file is needed, the server determines which pair has the needed file, and then determines which disk drive within the pair should be accessed. The determination is made to balance the access load within the pair, and can select to retrieve the file from the drive which is least frequently accessed. The identification of the disk drive to be accessed is then forwarded to the client thereby allowing the client to access the appropriate disk drive to retrieve the file.

34 Claims, 33 Drawing Sheets

Synchronous Data Write Sequence where Mirrors in the Same Storage System

U.S. PATENT DOCUMENTS

| | | |
|---|---|---|
| 5,867,706 A | 2/1999 | Martin et al. |
| 5,878,218 A * | 3/1999 | Maddalozzo et al. ........ 709/213 |
| 5,890,156 A | 3/1999 | Rekieta et al. |
| 5,917,998 A | 6/1999 | Cabrera et al. |
| 5,920,725 A | 7/1999 | Ma et al. |
| 5,950,203 A | 9/1999 | Stakuis et al. |
| 6,003,045 A | 12/1999 | Freitas et al. |
| 6,006,264 A | 12/1999 | Colby et al. |
| 6,052,718 A * | 4/2000 | Gifford ........................ 709/219 |
| 6,061,685 A * | 5/2000 | Fantenberg ................... 707/10 |
| 6,061,761 A * | 5/2000 | Bachmat ...................... 711/114 |
| 6,088,330 A * | 7/2000 | Bruck et al. ................. 370/228 |
| 6,088,766 A * | 7/2000 | Bachmat et al. ............ 711/114 |
| 6,092,213 A | 7/2000 | Lennie et al. |
| 6,189,071 B1 * | 2/2001 | Bachmat ...................... 711/114 |
| 6,230,190 B1 * | 5/2001 | Edmonds et al. ............ 709/213 |
| 6,237,063 B1 * | 5/2001 | Bachmat et al. ............ 711/114 |
| 6,282,671 B1 | 8/2001 | Islam et al. |
| 6,314,458 B1 | 11/2001 | Steele et al. |
| 6,324,580 B1 * | 11/2001 | Jindal et al. ................. 709/228 |
| 6,324,692 B1 | 11/2001 | Fiske |
| 6,397,292 B1 | 5/2002 | Venkatesh et al. |
| 6,408,369 B1 | 6/2002 | Garret et al. |
| 6,487,634 B1 * | 11/2002 | Bachmat ...................... 711/112 |
| 6,502,205 B1 | 12/2002 | Yanai et al. |
| 6,516,350 B1 * | 2/2003 | Lumelsky et al. ........... 709/226 |
| 6,542,962 B2 * | 4/2003 | Kodama et al. ............. 711/114 |
| 6,601,101 B1 * | 7/2003 | Lee et al. .................... 709/227 |
| 6,606,643 B1 * | 8/2003 | Emens et al. ................ 709/203 |
| 6,633,538 B1 | 10/2003 | Tanaka et al. |
| 6,654,752 B2 | 11/2003 | Ofek |
| 6,694,406 B2 * | 2/2004 | Kodama et al. ............. 711/114 |
| 6,799,245 B1 * | 9/2004 | Kochiya ...................... 711/114 |
| 6,826,613 B1 * | 11/2004 | Wang et al. ................. 709/227 |
| 6,912,668 B1 | 6/2005 | Brown et al. |
| 6,922,724 B1 * | 7/2005 | Freeman et al. ............. 709/223 |
| 7,051,066 B1 * | 5/2006 | Albert et al. ................ 709/202 |
| 7,072,979 B1 * | 7/2006 | Aviani et al. ................ 709/239 |
| 7,188,157 B1 * | 3/2007 | Kodama et al. ............. 709/220 |

* cited by examiner

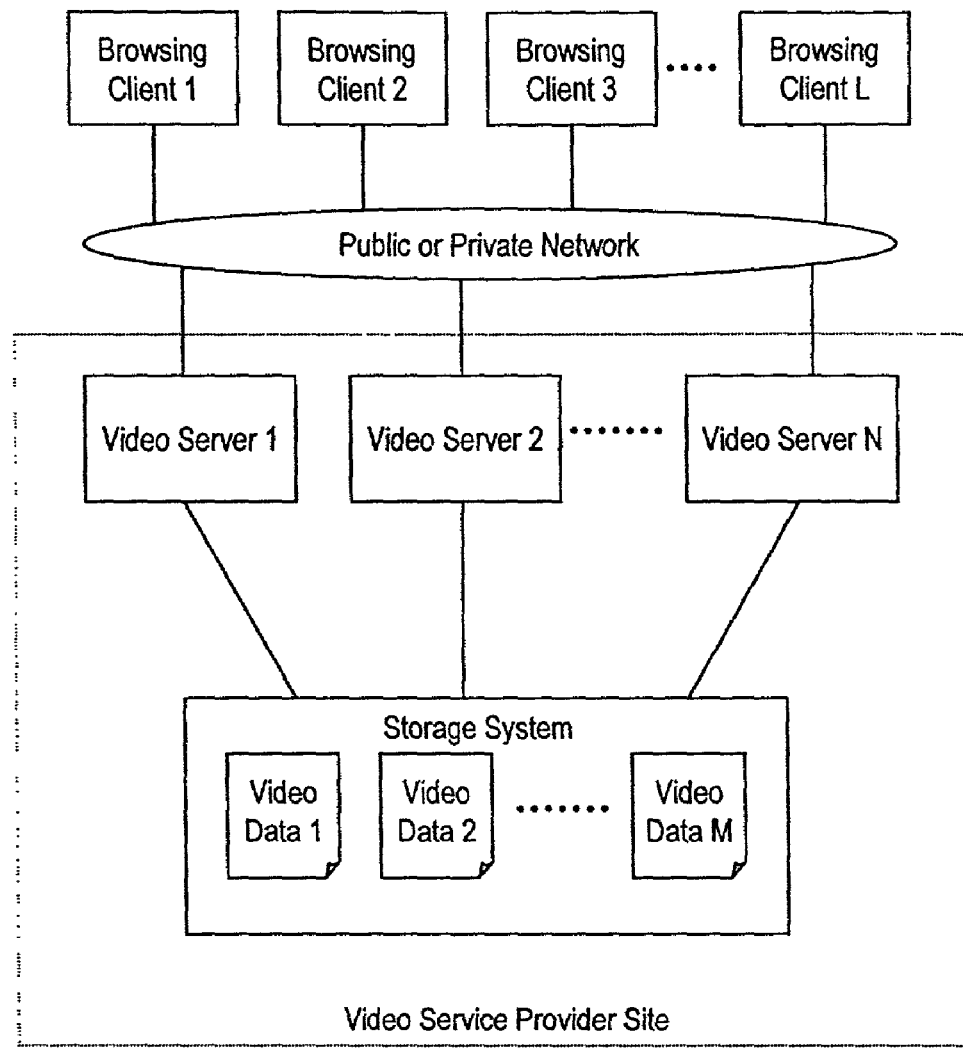
Figure 1. System Configuration of Clustered Video Server System

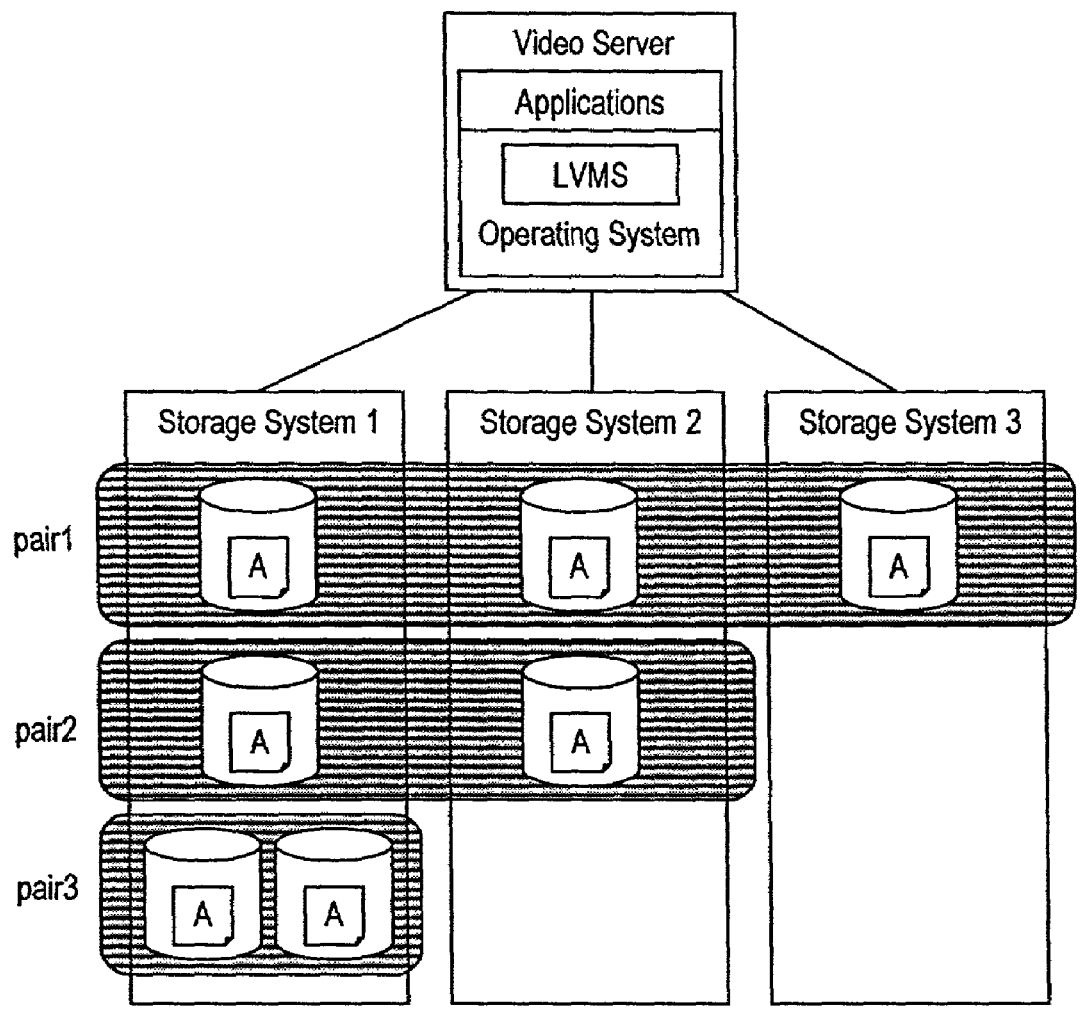
Figure 2. Example of Disk Mirroring on Multiple Storage Systems by LVMS

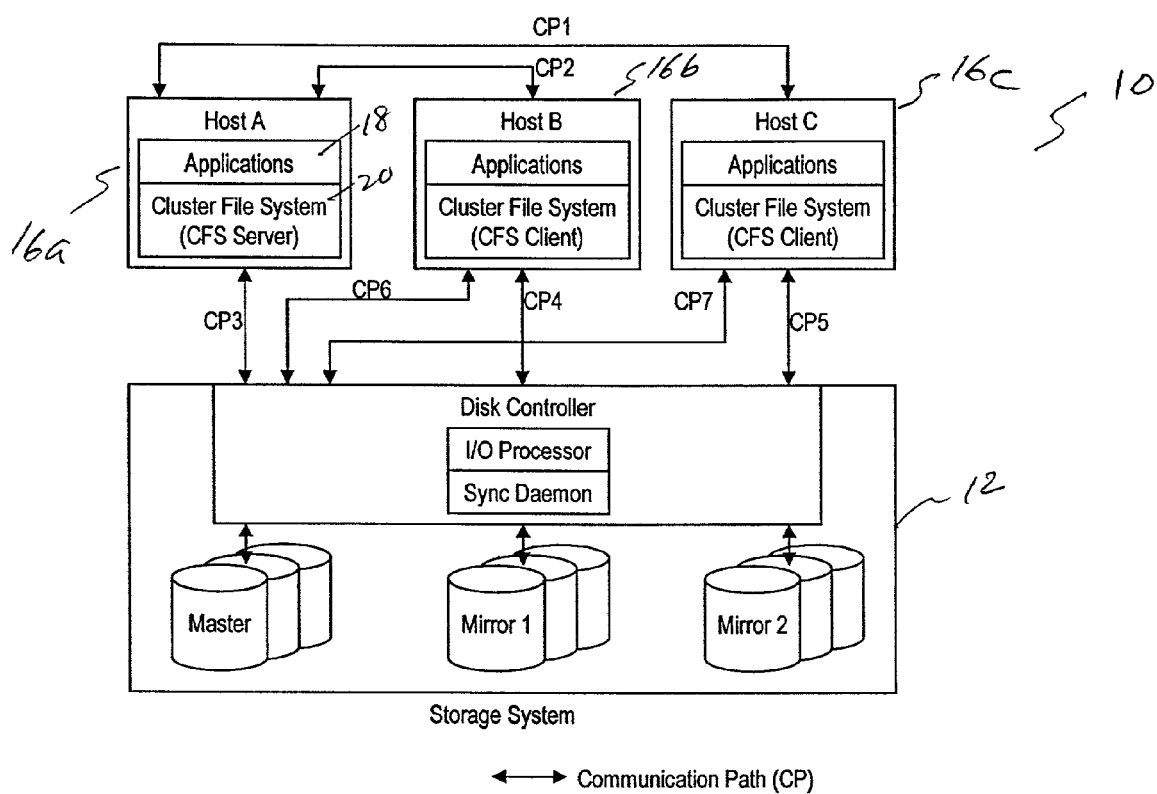
Figure 3 System Configuration where Mirrors in the Same Storage System

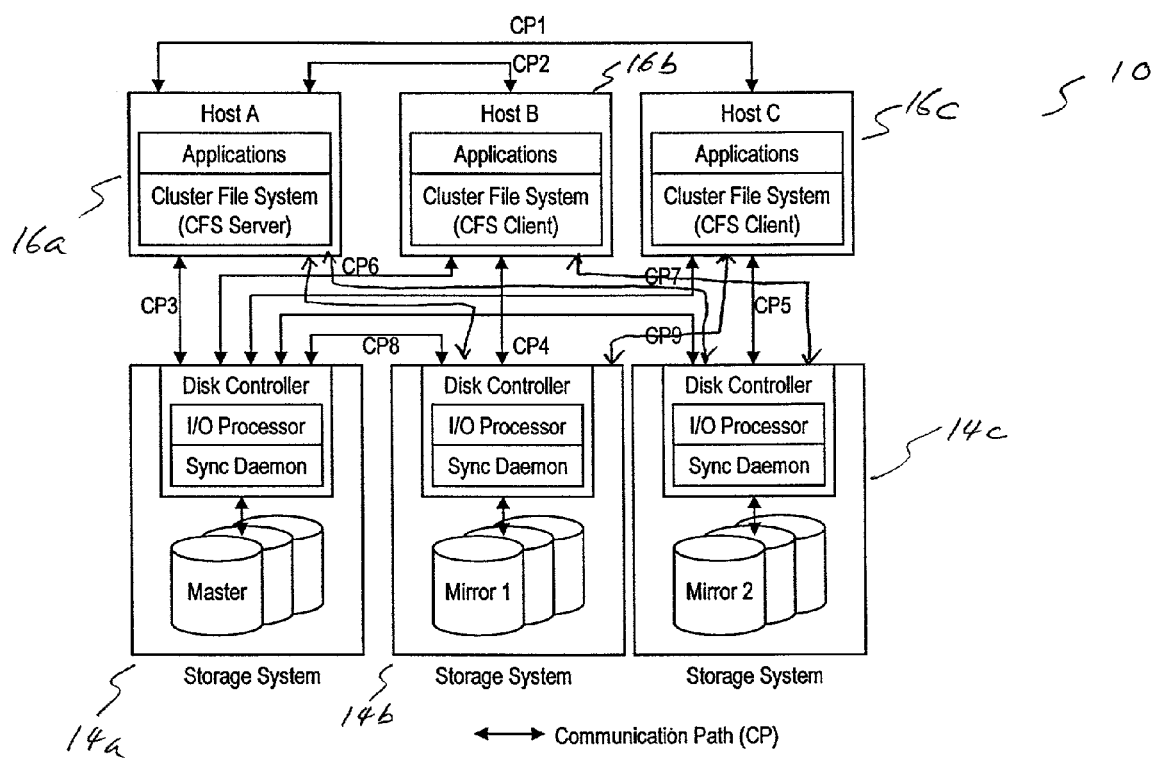
Figure 4. System Configuration of Second Description

| Pair Name | Master | | Mirror 1 | | Mirror 2 | | |
|---|---|---|---|---|---|---|---|
| | SS ID | Vol ID | SS ID | Vol ID | SS ID | Vol ID | ........ |
| pair1 | 1 | 8 | 2 | 2 | 3 | 5 | ........ |
| pair2 | 1 | 12 | 1 | 7 | N/A | N/A | ........ |
Figure 5. Pair Configuration Table
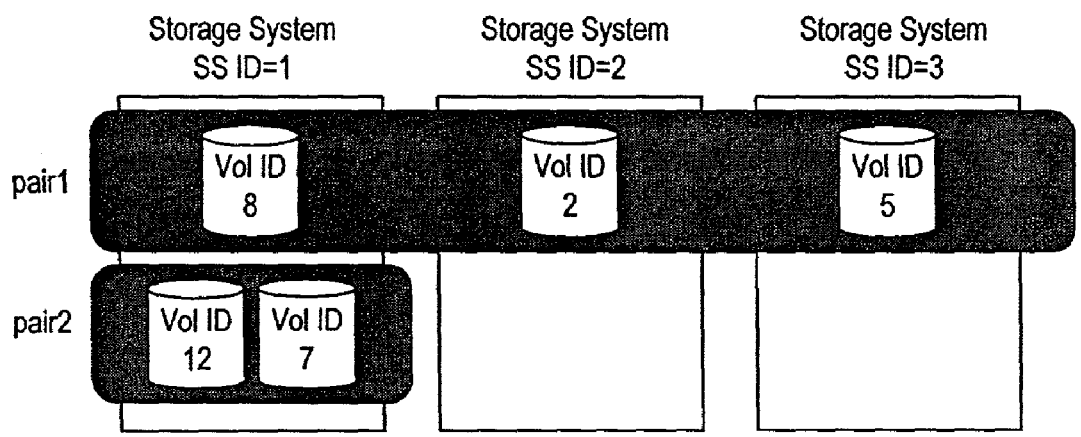
Figure 6. Graphical Understanding about Mirroring Configuration
| Pair Name | Master | Mirror 1 | Mirror 2 | |
|---|---|---|---|---|
| pair1 | 100 | 200 | 50 | ........ |
| pair2 | 300 | 10 | N/A | ........ |
Figure 7. Usage Table of Pairs

| File Name | Block #1 | | | Block #2 | | | Block #3 | | | |
|---|---|---|---|---|---|---|---|---|---|---|
| | SS ID | Vol ID | Offset | SS ID | Vol ID | Offset | SS ID | Vol ID | Offset | |
| file1 | 1 | 8 | 100 | 1 | 8 | 700 | 1 | 8 | 900 | ....... |
| file2 | 1 | 8 | 200 | 1 | 8 | 150 | 1 | 8 | 600 | ....... |
| file3 | 1 | 12 | 10 | 1 | 12 | 80 | 1 | 12 | 100 | ....... |
Figure 7. File Allocation Table of CFS Server
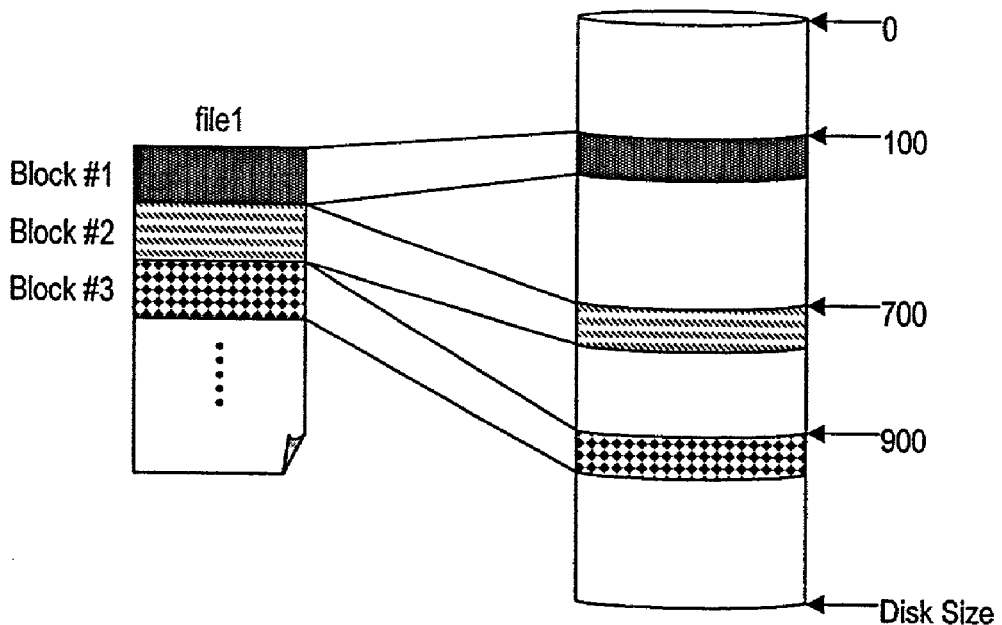
Figure 8 Graphical Understanding about File Allocation List

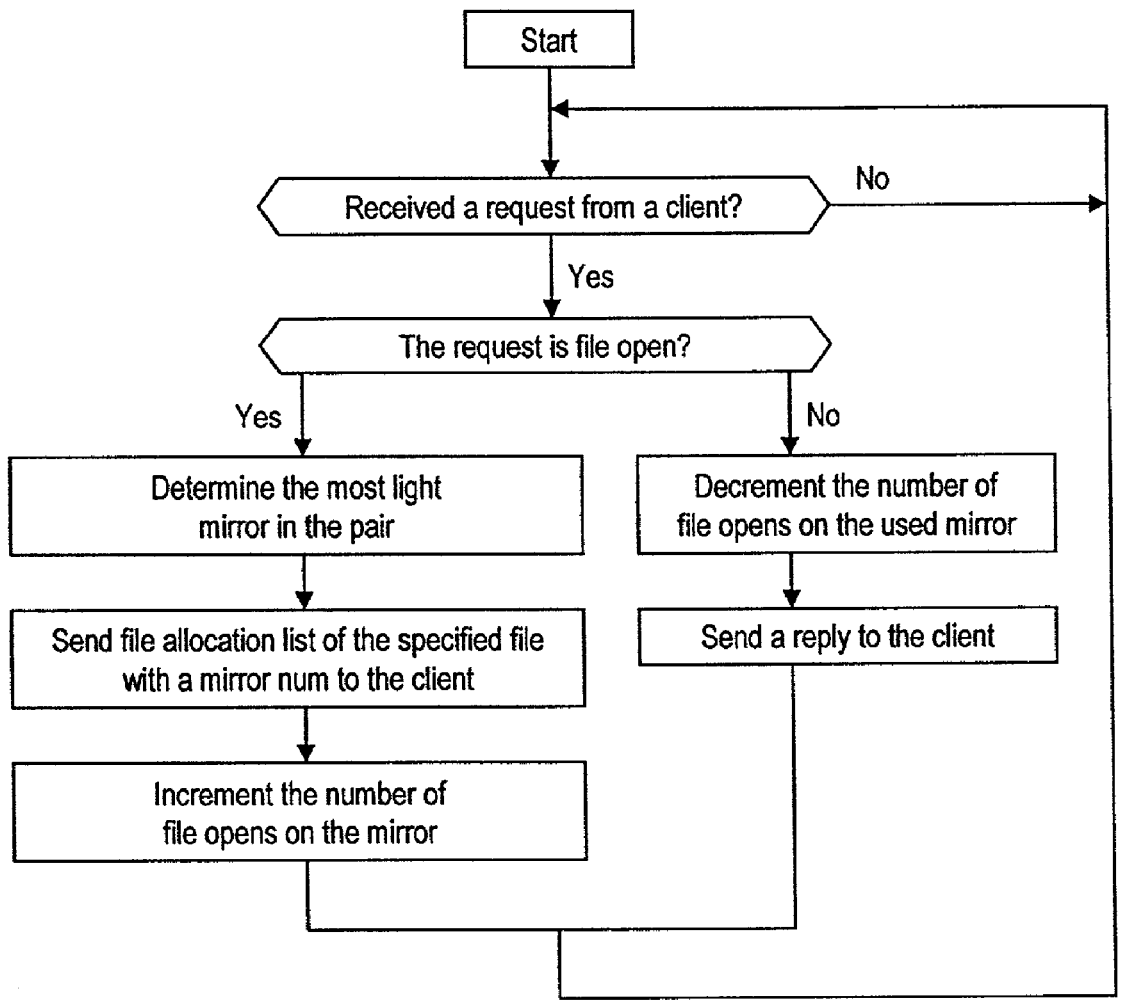
Figure 10 Process Sequence of CFS Server

```
struct {
    int mirror_num;
    int block_num;
    struct {
        int master_ss_id;
        int master_vol_id;
        int offset;
    } block_list[block_num];
} file_allocation_list
```

Figure 1f. The Format of File Allocation List

```
struct {
    int type;
    union {
        struct {
            char *filename;
            int mode;
        } open;
        struct {
            int file_id;
            int offset;
            int size;
            char *buf;
        } write;
        struct {
            int file_id;
            int offset;
            int size;
            char *buf;
        } read;
        struct {
            int file_id;
        } close;
    } u;
} file_io_request
```

Figure 12. File I/O Request Format

```
#define    File_Open    1
#define    File_Write   2
#define    File_Read    3
#define    File_Close   4
```

Figure 13. File I/O Type

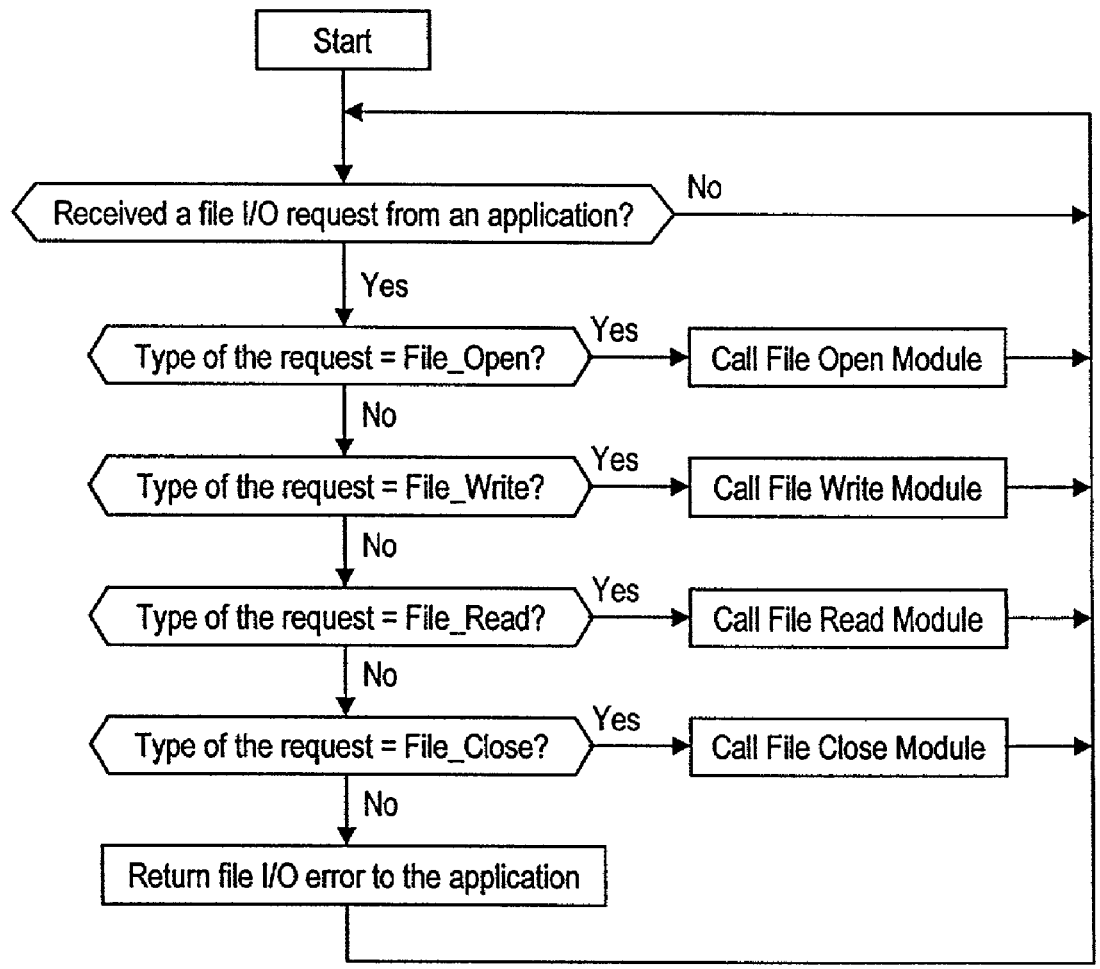
Figure 14 Process Sequence of CFS Client

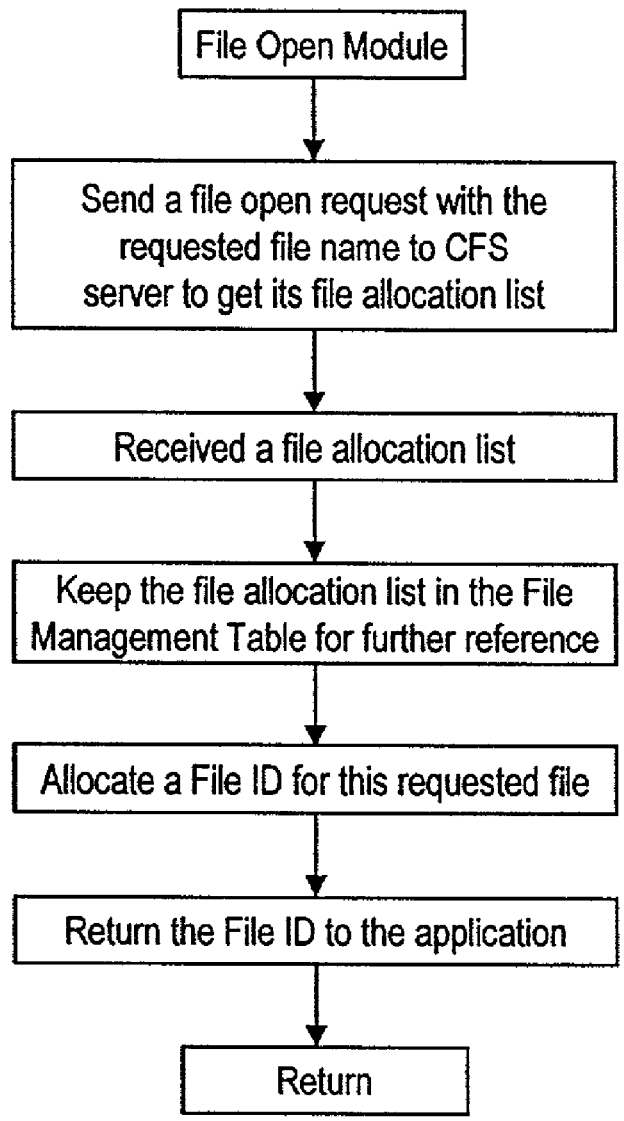
Figure 15. File Open Module
```
struct {
    struct file_allocation_list *fal;
} file_mgmt_table[max_file_id];
```
Figure 16. File Management Table

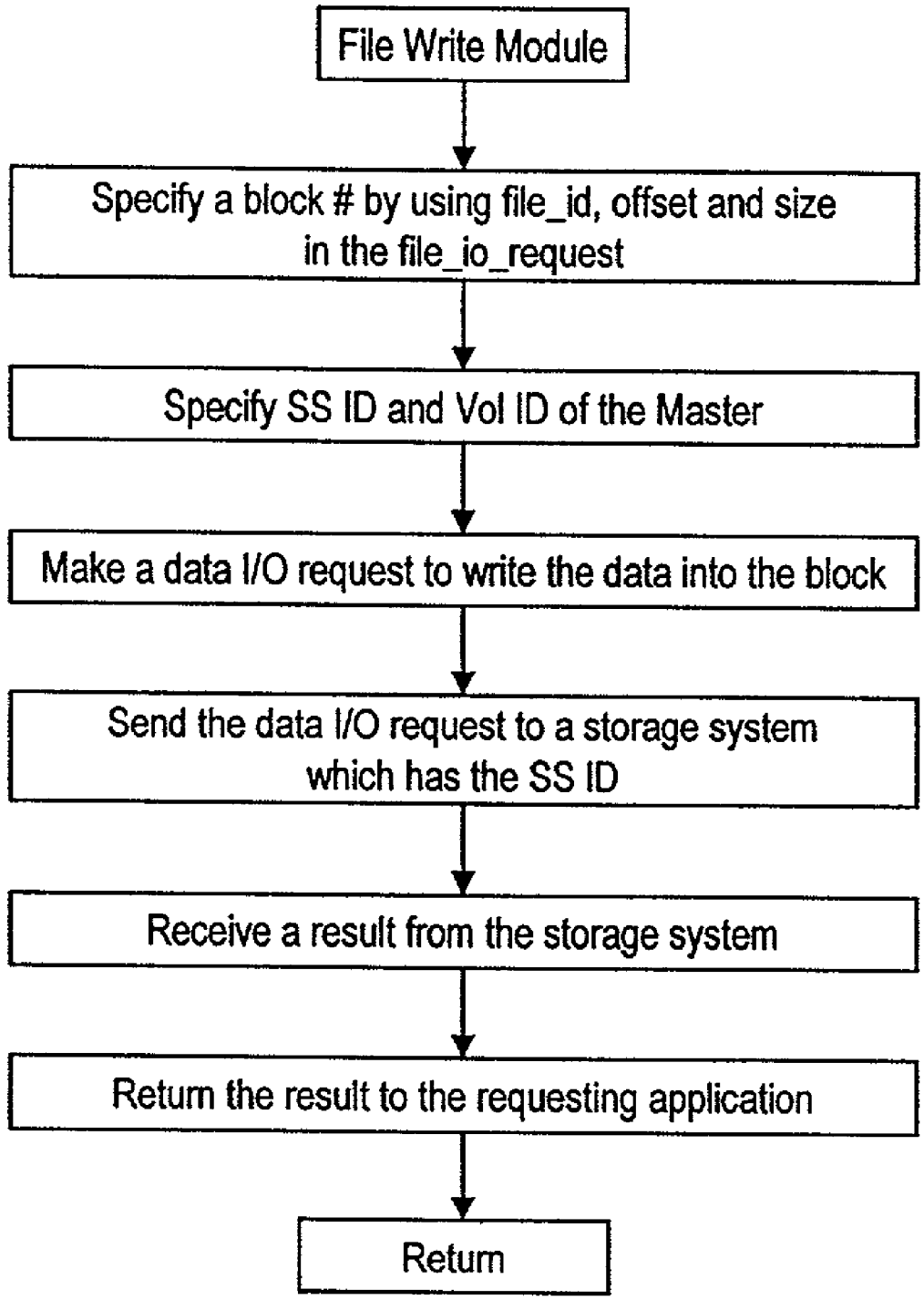
Figure 17. File Write Module

```
struct {
    int type;
    int vol_id;
    int offset;
    int size;
    char *data;
} data_io_request
```

Figure 18. Data I/O Request

```
#define Data_Read      1
#define Data_Write     2
```

Figure 19. Types of Data I/O Request

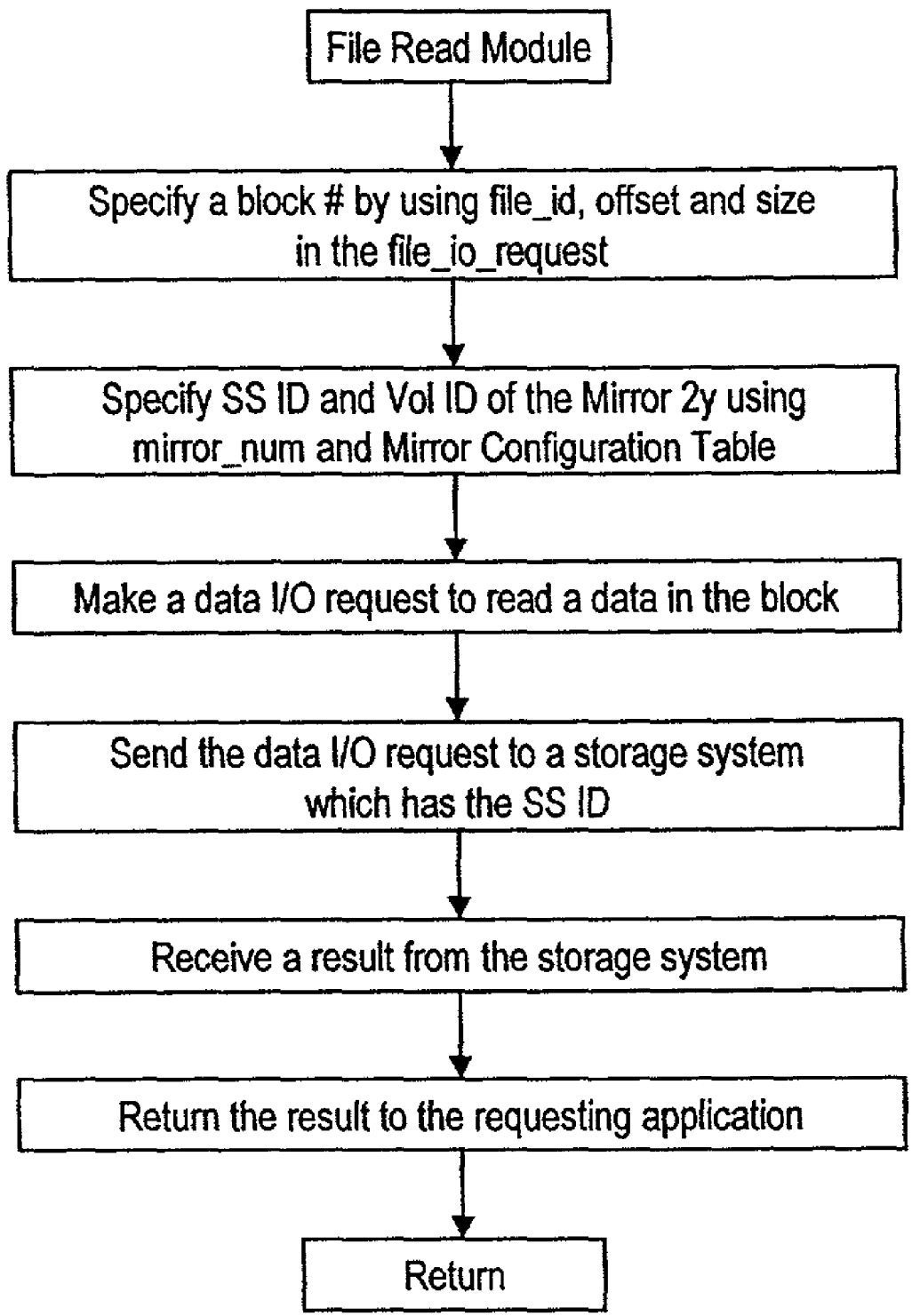
Figure 20 File Read Module

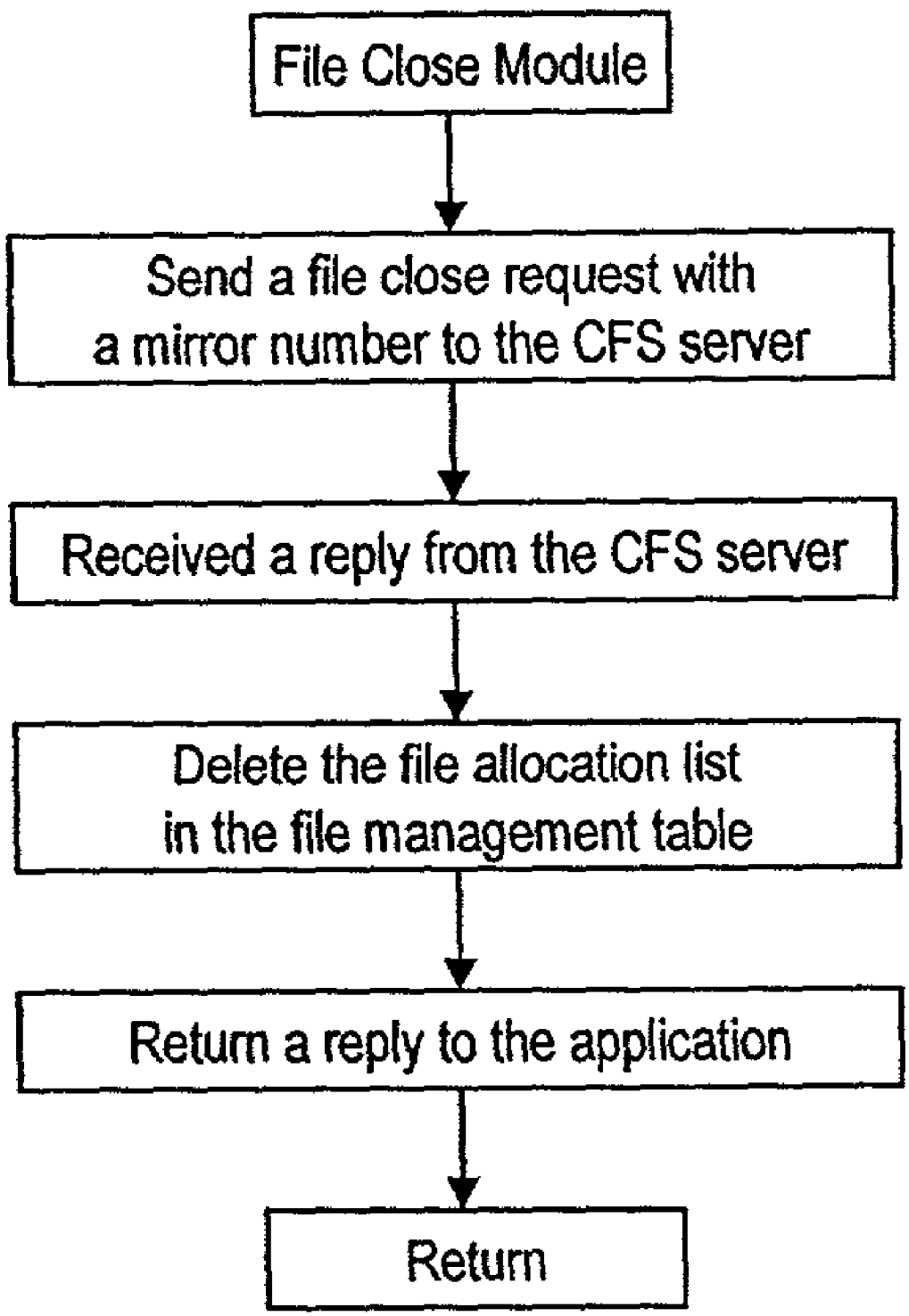
Figure 2.1 File Close Module

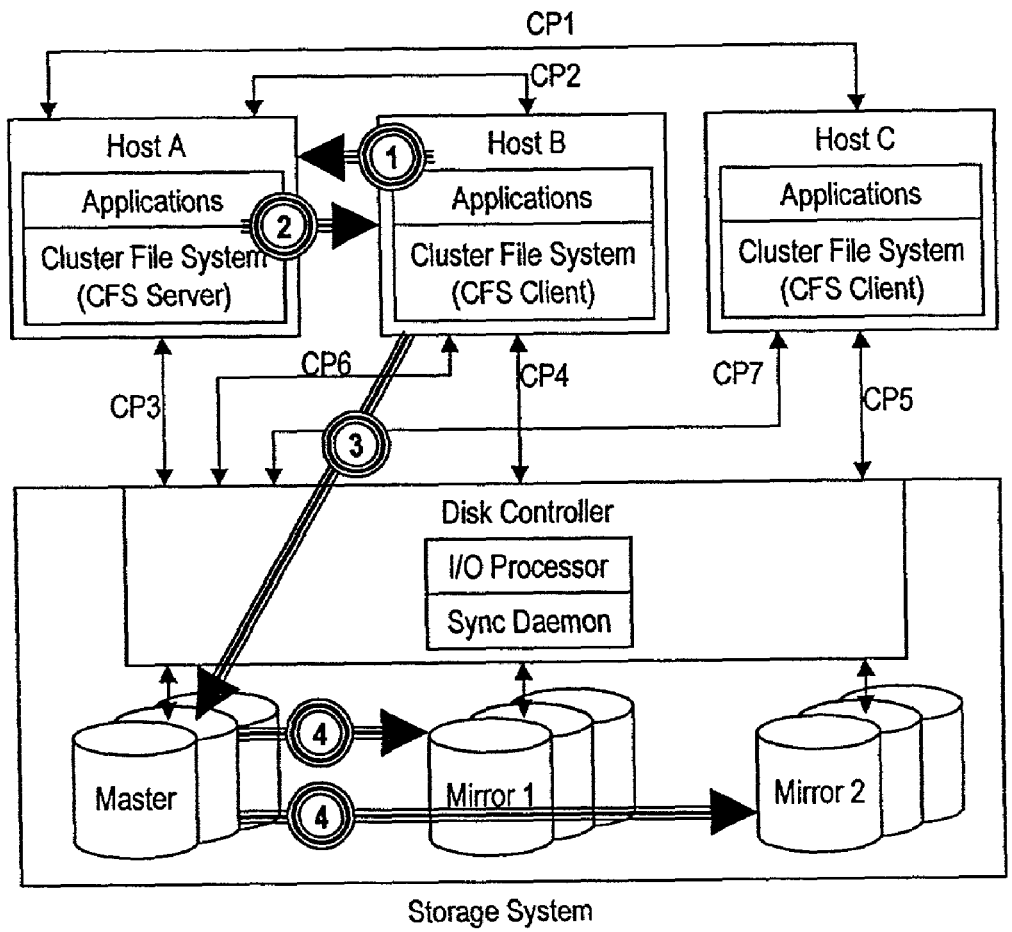
Figure 22 Synchronous Data Write Sequence where Mirrors in the Same Storage System

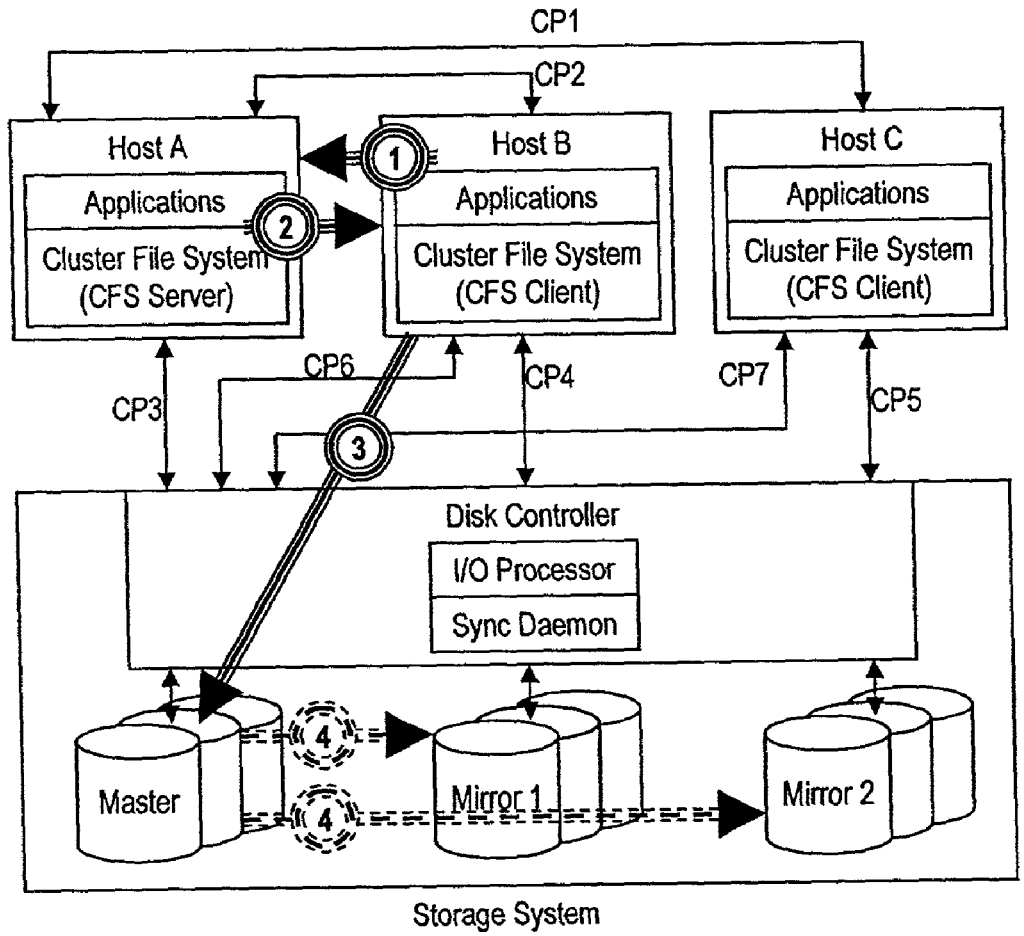
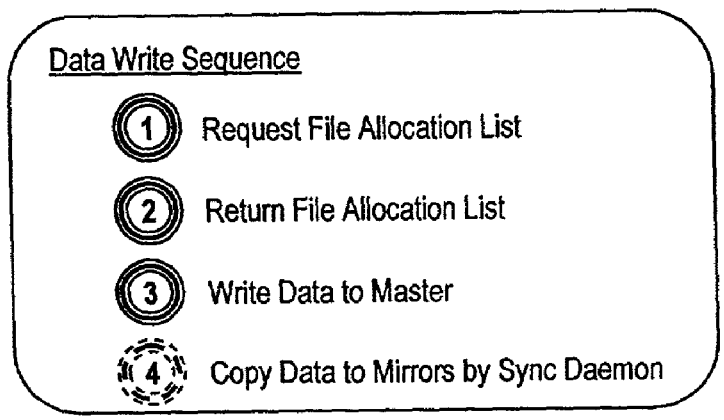
Figure 23. Asynchronous Data Write Sequence where Mirrors in the Same Storage System

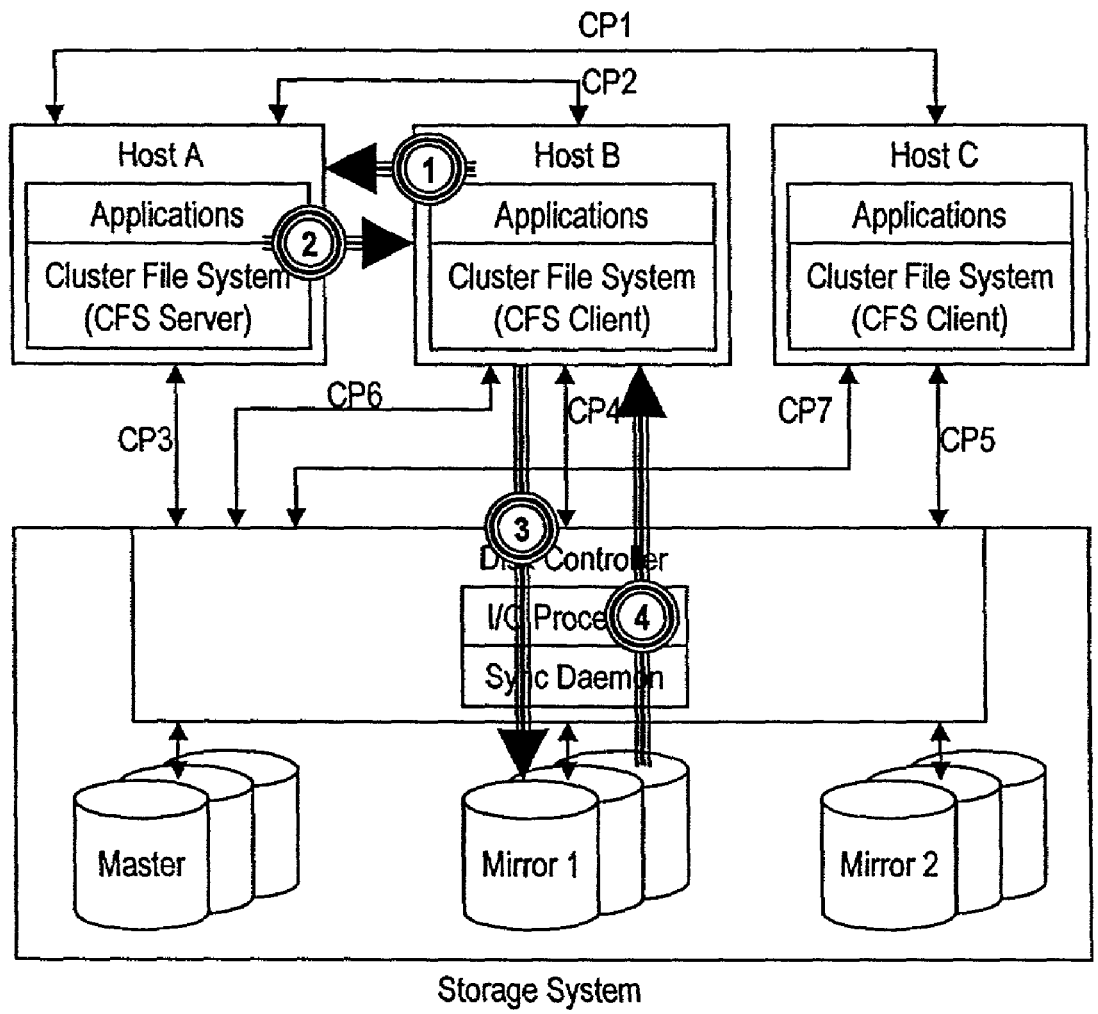
Figure 24 Data Read Sequence where Mirrors in the Same Storage System
(A Case of Synchronous Data Write or Async Data Write and Data is on Mirror)

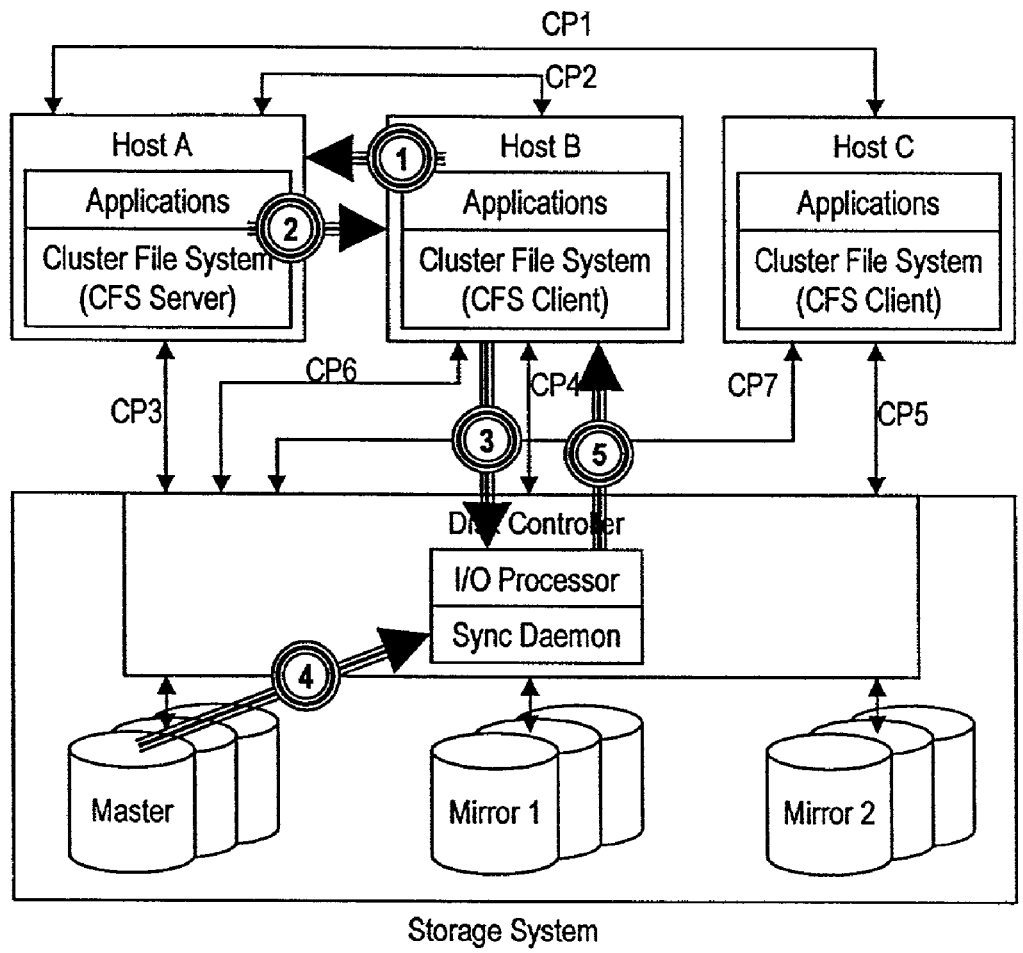
Figure 25 Data Read Sequence where Mirrors in the Same Storage System
(A Case of Asynchronous Data Write and Data is not on Mirror)

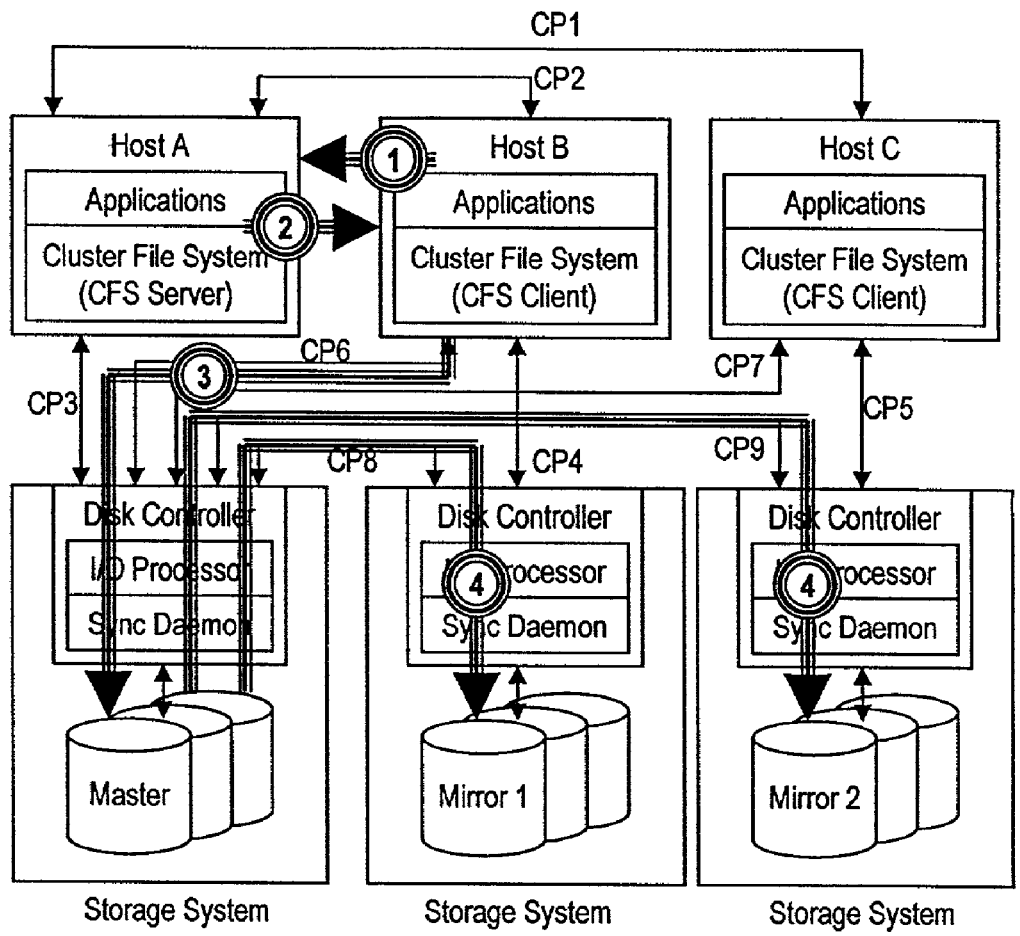
Figure 2.6 Synchronous Data Write Sequence where Mirrors on Different Storage Systems

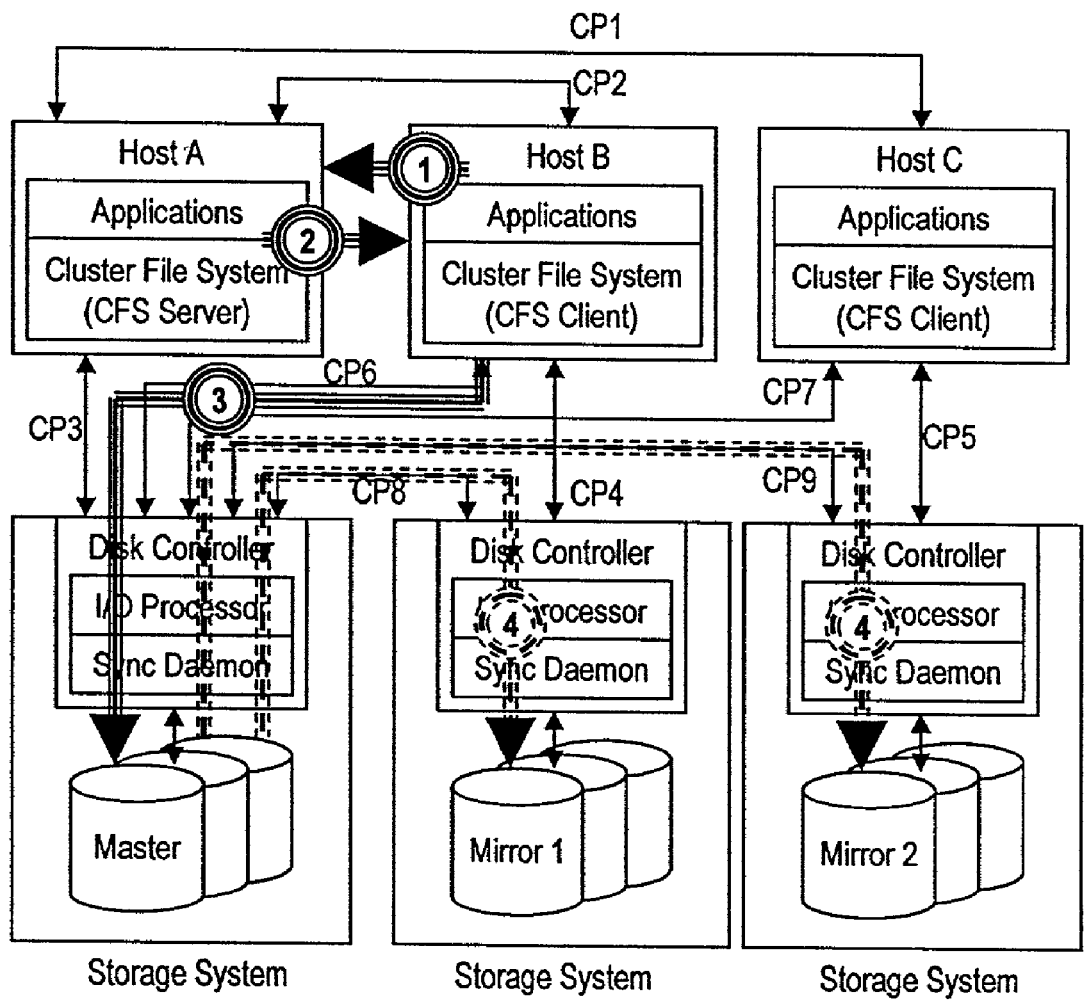
Figure 27 Asynchronous Data Write Sequence where Mirrors on Different Storage Systems

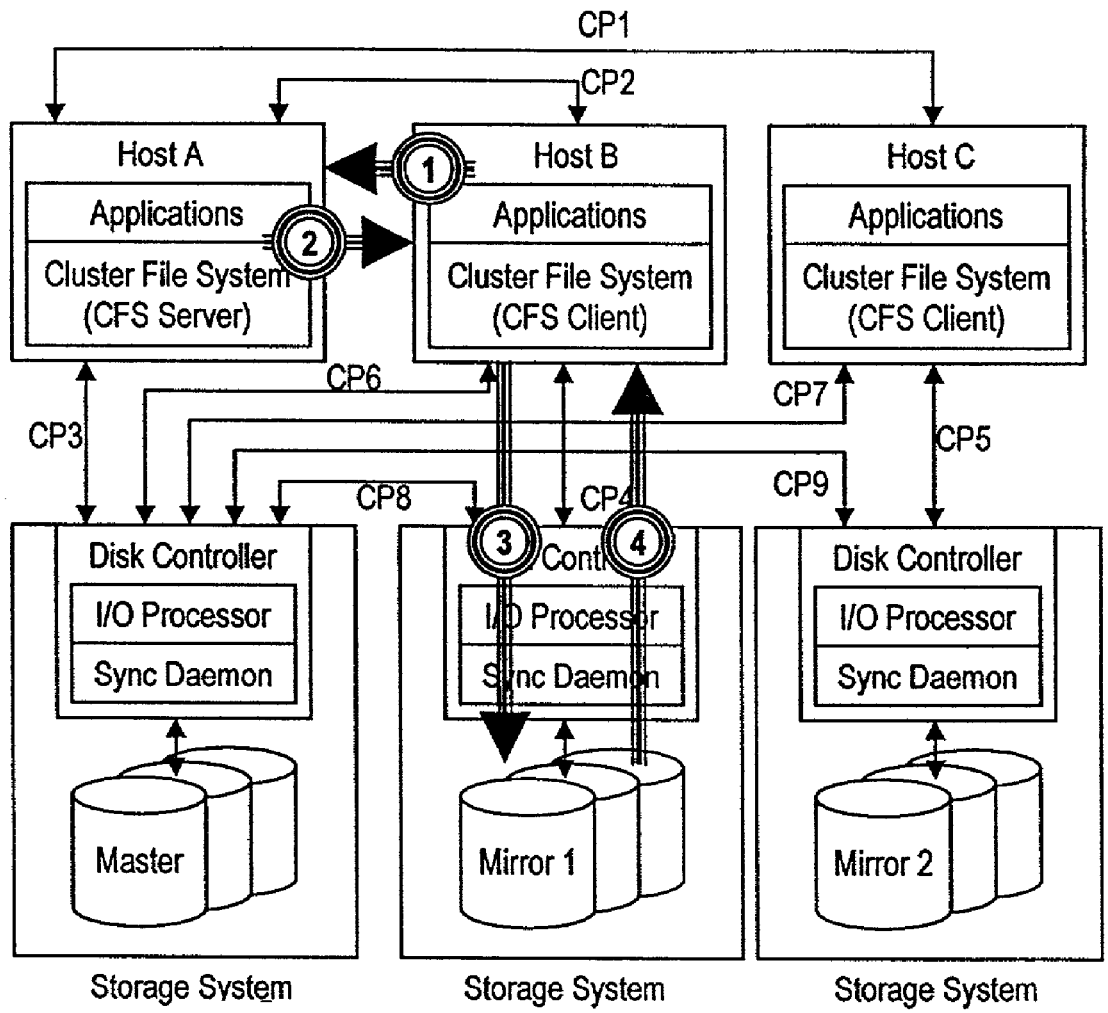
Figure 28 Data Read Sequence where Mirrors on Different Storage Systems
(A Case of the Synchronous Data Write or Async Data Write and Data is on Mirror)

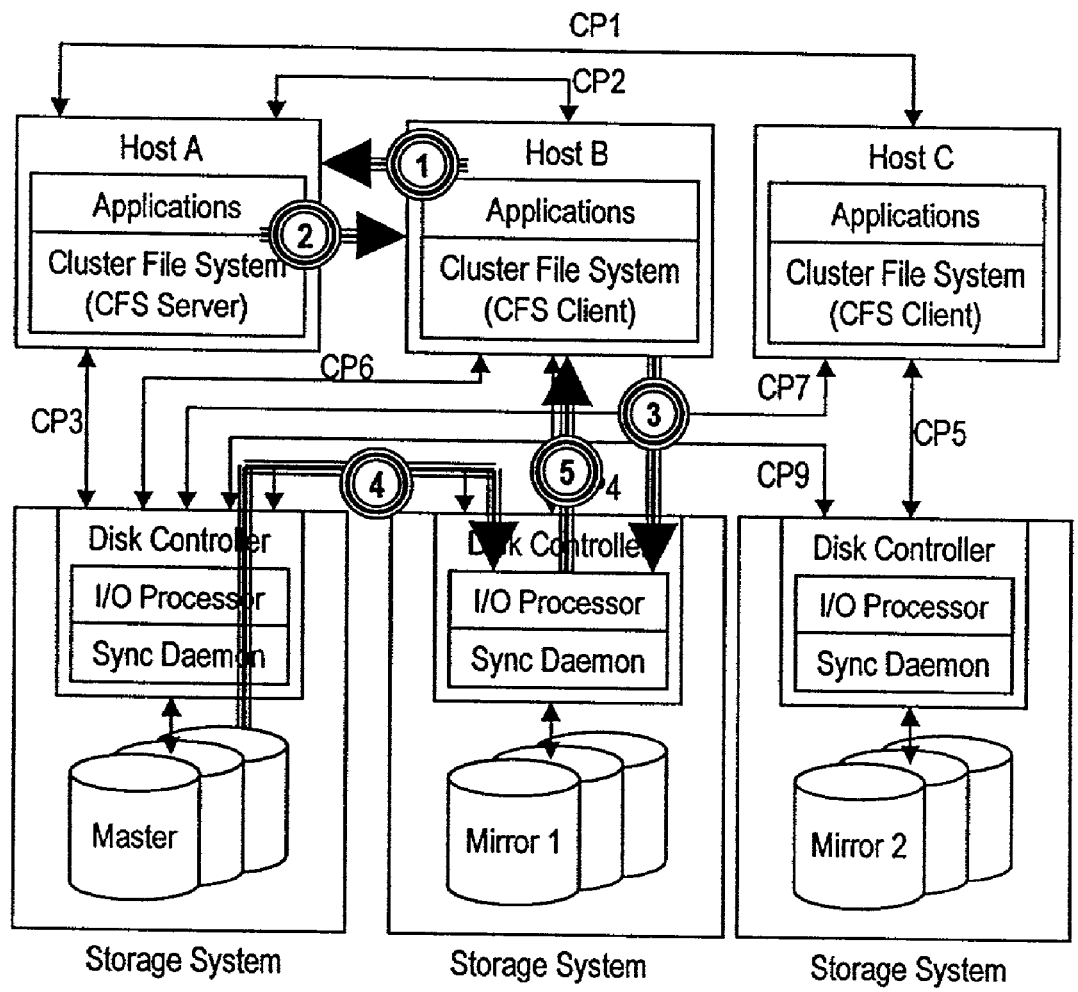
Figure 29 Data Read Sequence where Mirrors on Different Storage Systems
(A Case of the Asynchronous Data Write and Data is not on Mirror)

|  | | Same Storage System | Different Storage Systems |
|---|---|---|---|
| Sync Data Write | Data Write | Figure 22 | Figure 26 |
|  | Data Read | Figure 24 | Figure 28 |
| Async Data Write | Data Write | | Figure 23 | Figure 27 |
|  | Data Read / Data is in Mirror | Figure 24 | Figure 28 |
|  | Data Read / Data is not in Mirror | Figure 25 | Figure 29 |

Figure 30 Relationship between Figures and Read/Write Cases

| Pair Name | Mirror ID | SS ID | Vol ID | Cluster #1 | Cluster #2 | Cluster #3 | ........ |
|---|---|---|---|---|---|---|---|
| pair1 | Mirror 1 | 1 | 1 | Valid | Invalid | Valid | ........ |
| | Mirror 2 | 2 | 2 | Invalid | Invalid | Valid | ........ |
| | ⋮ | ⋮ | ⋮ | ⋮ | ⋮ | ⋮ | ........ |
| | Mirror N | 2 | 2 | Invalid | Valid | Valid | ........ |
| pair2 | Mirror 1 | 1 | 1 | Valid | Valid | Valid | ........ |
| ⋮ | ⋮ | ⋮ | ⋮ | ⋮ | ⋮ | ⋮ | |

Figure 31. Bitmap Table

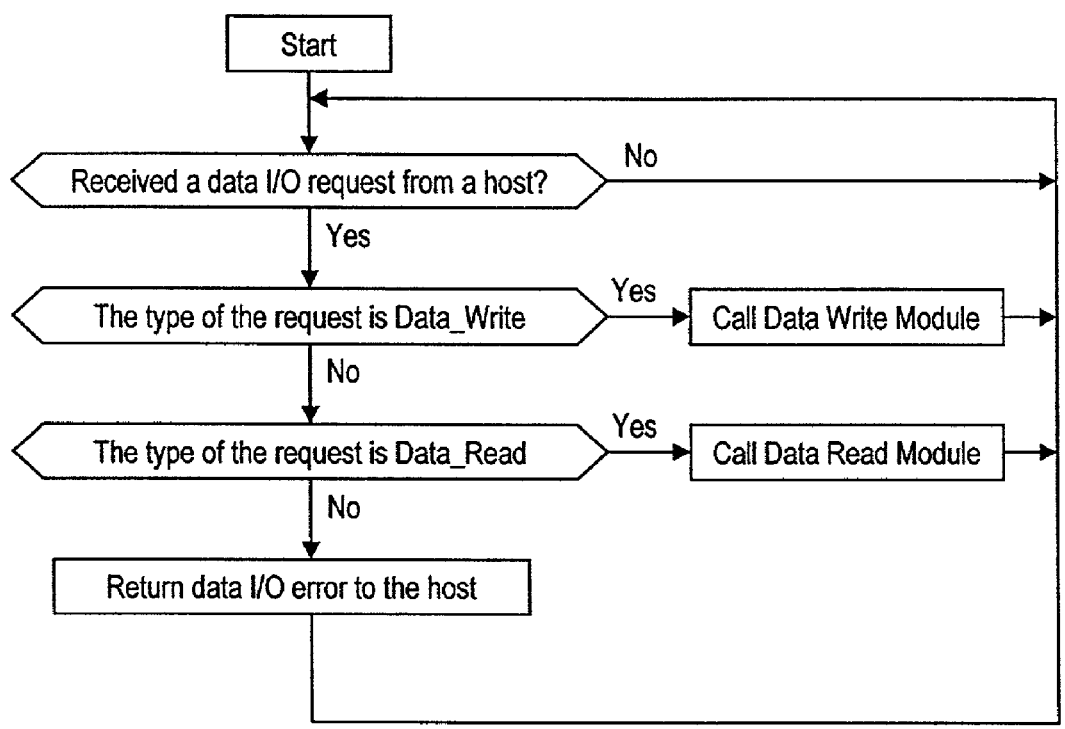
Figure 32. Process Sequence of I/O Processor

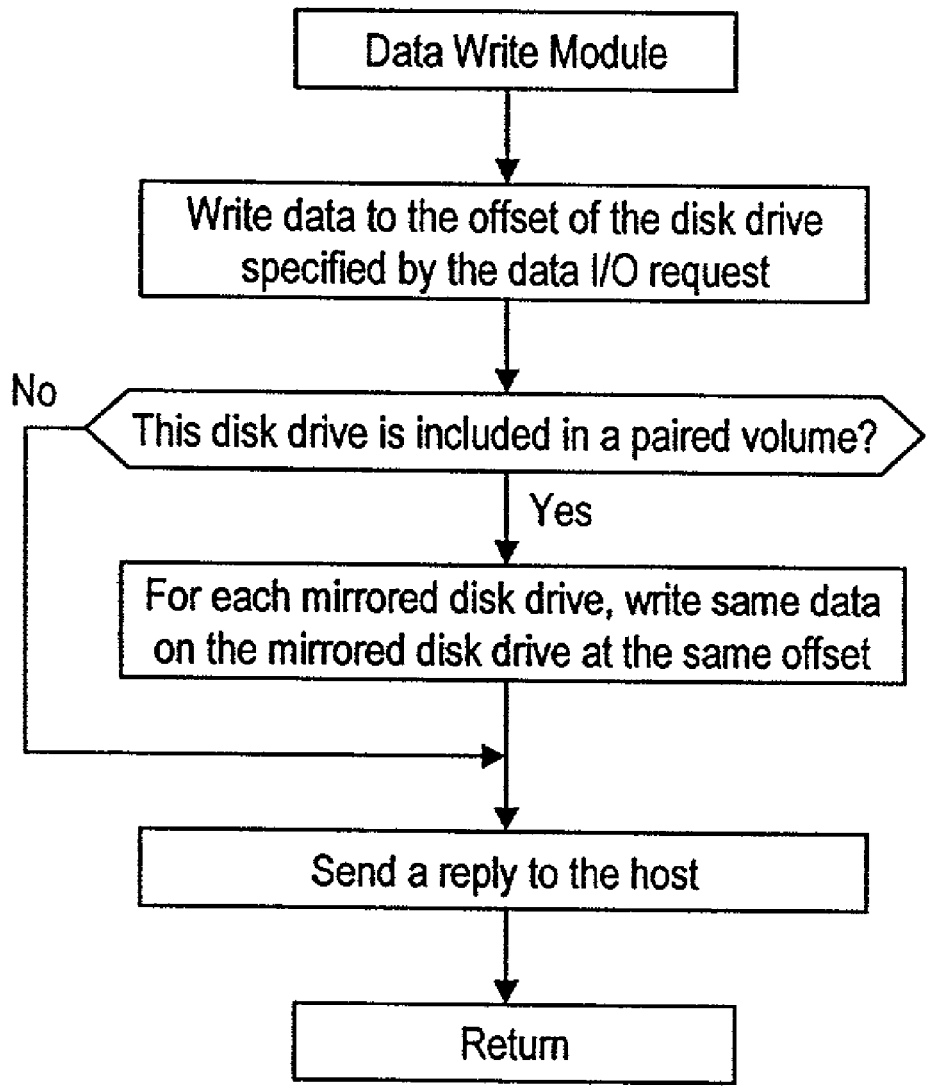
Figure 33. Data Write Module for Synchronous Data Write

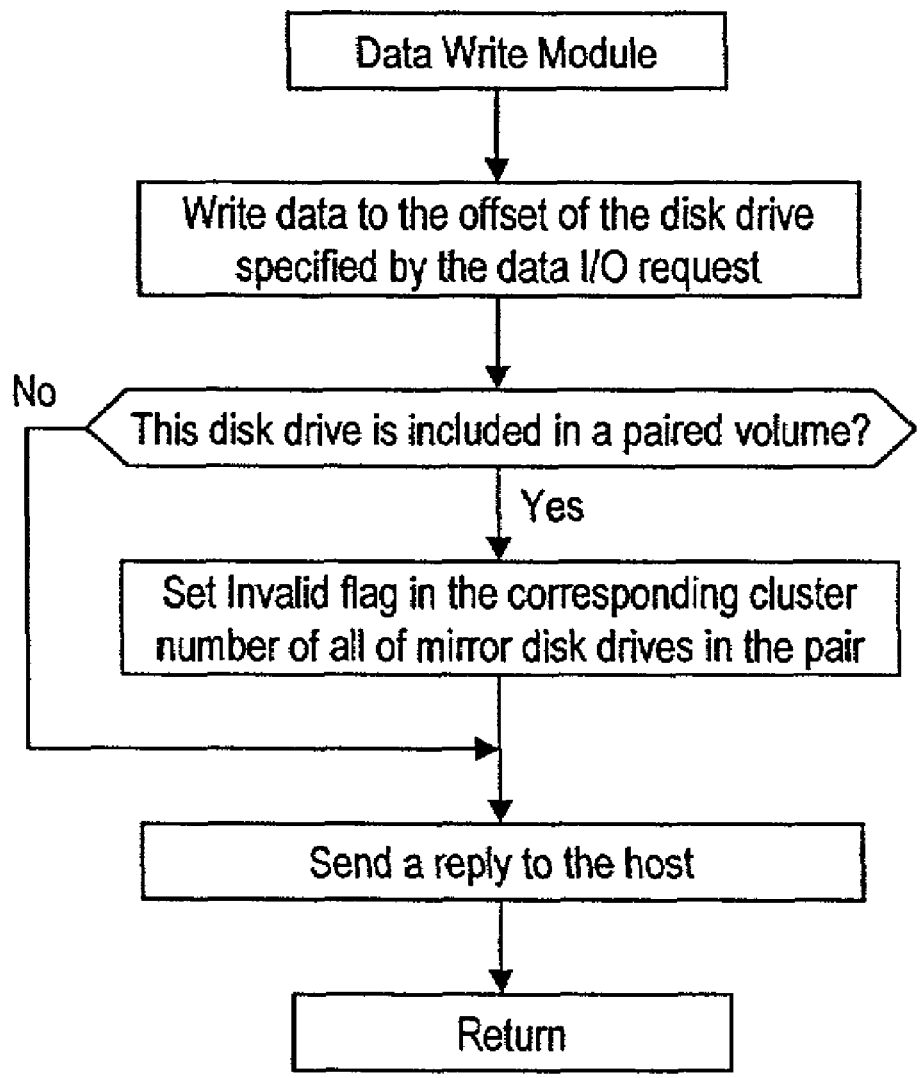
Figure 34. Data Write Module for Asynchronous Data Write

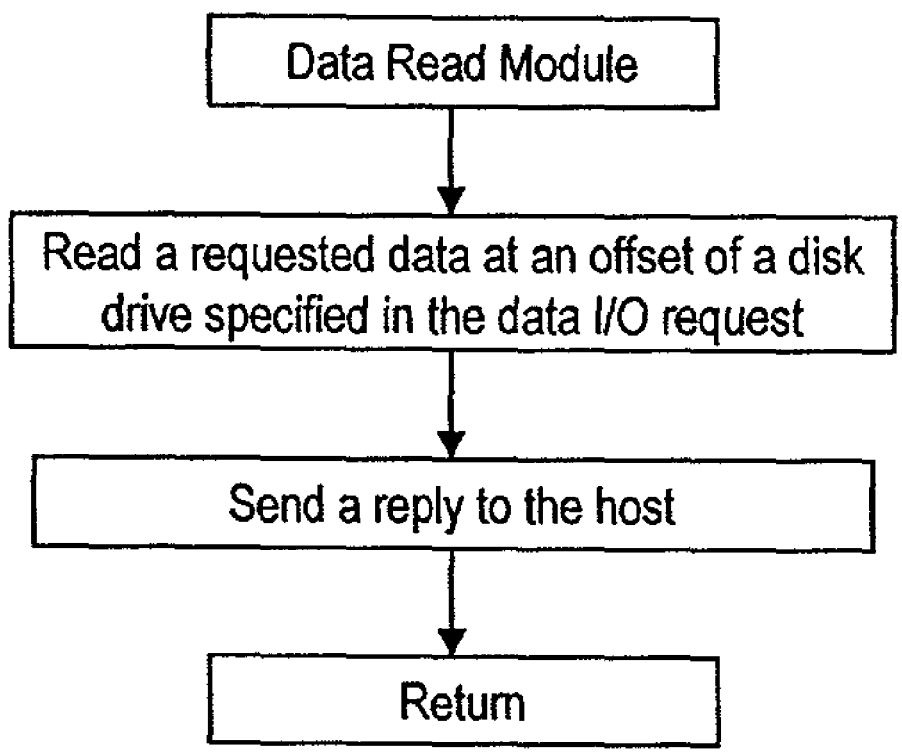
Figure 35. Data Read Module for Synchronous Write

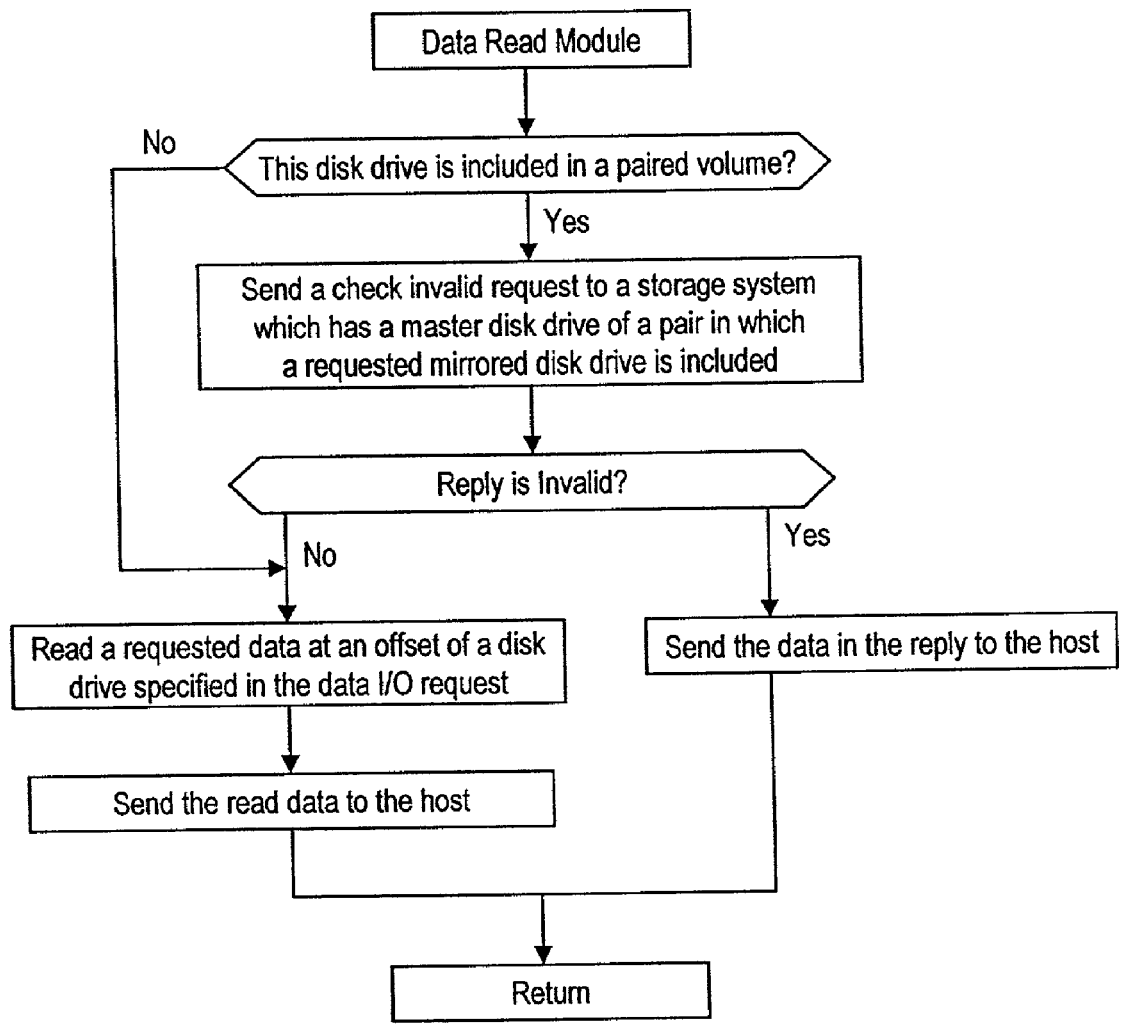
Figure 36. Data Read Module for Asynchronous Write

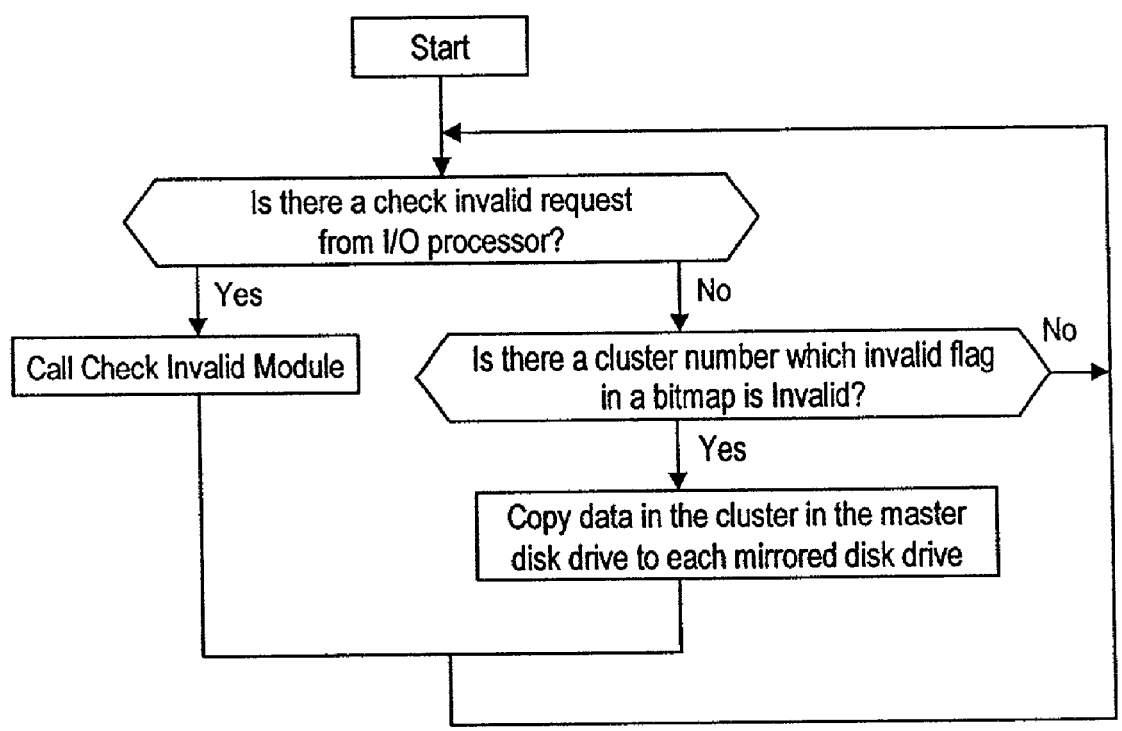
Figure 37. Process Sequence of Sync Daemon

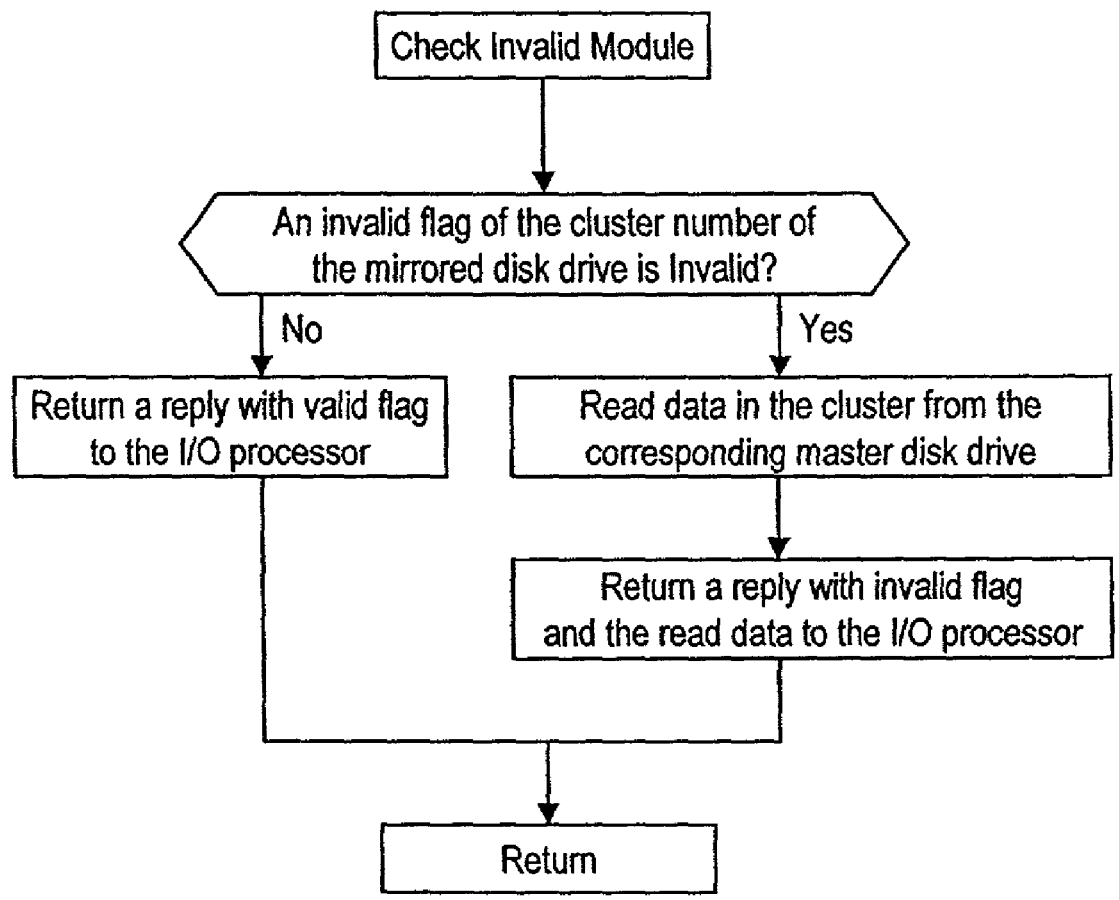
Figure 38. Check Invalid Module

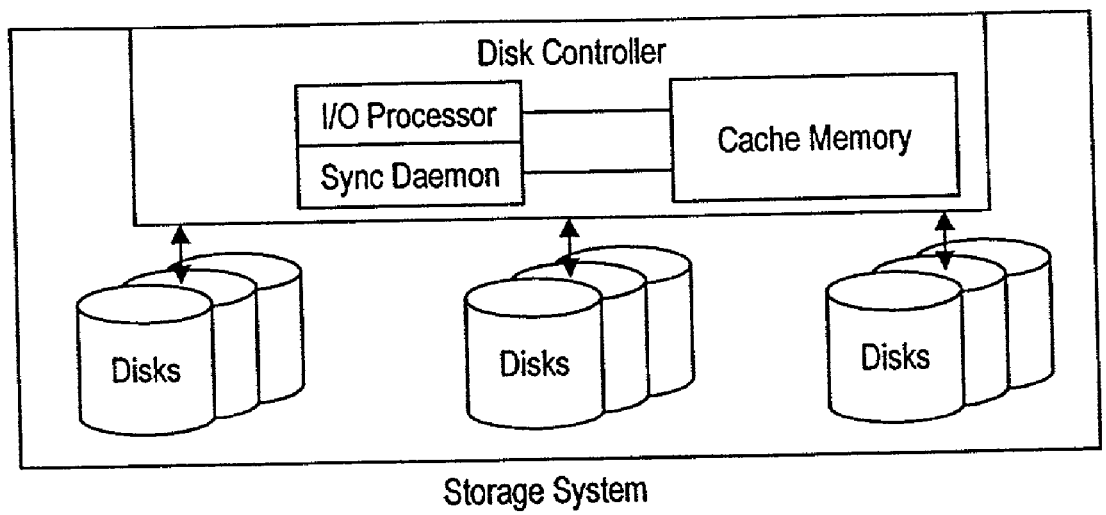
Figure 39. Storage System with Cahe Memory

FILE SHARING SYSTEM WITH DATA MIRRORING BY STORAGE SYSTEMS

CROSS-REFERENCES TO RELATED APPLICATIONS

This is a continuation-in-part application from commonly assigned U.S. patent application Ser. No. 09/606,403, filed on Jun. 30, 2000 now U.S. Pat. No. 7,188,157, entitled "Continuous Update of Data in a Data Server System" by Kodama et al., and U.S. patent application Ser. No. 09/815,494, filed on Mar. 21, 2001 now U.S. Pat. No. 6,542,962, entitled "Multiple Processor Data Processing System With Mirrored Data for Distributed Access" by Kodama et al., the disclosures of which are hereby incorporated by reference in their entirety for all purposes.

BACKGROUND OF THE INVENTION

The present invention generally relates to file storage systems. More specifically, the present invention relates to a system and method for optimizing data access pertaining to a file sharing system with data mirroring by file storage systems.

Generally, a file storage system contains many files which are concurrently accessible to many hosts or clients. Many kinds of applications may be running on the hosts and some applications may share files and process some tasks in cooperation. One example of such applications is a clustered video server system. A typical task of the video server system is to send streaming video data to a browsing client through a computer network. The size of the video data is usually very large in the range of several gigabytes or more. Consequently, sending video data is often a time-consuming process. It is, therefore, inefficient to have only one video server handle sending of video data to multiple hosts.

A typical solution used to overcome this limitation is to utilize multiple video servers and have them send video data in a parallel or concurrent manner. As mentioned above, the size of video data is usually large. Consequently, if a copy of the video data is to be stored on the local disk drive of each video server, a lot of disk capacity is required for each video server and the associated costs for maintaining the needed disk capacity on each video server are also quite high. As a result, it is a general approach to have multiple video servers share video data. FIG. 1 depicts a typical system configuration where a single storage system containing video data is shared by multiple video servers.

The single storage system, as shown in FIG. 1, suffers from at least four problems, namely, (1) performance bottleneck caused by storing video data in a single storage system, (2) performance bottleneck caused by storing video data on a single disk drive, (3) a single point of failure caused by storing video data in a single storage system, and (4) a single point of failure caused by storing video data on a single disk drive.

From a performance point of view, it is easy to see that the single storage system is constrained by a number of performance bottlenecks. For example, one performance bottleneck is the finite I/O throughput of the storage system. The I/O throughput of the storage system is not unlimited. Thus, as the number of browsing clients continues to increase, the I/O throughput of the storage system will at some point reach a maximum level thereby leaving the demands of some clients unfulfilled.

Another performance bottleneck resides inside of the storage system. The storage system contains many physical disk drives used to store data. The I/O throughput of a single disk drive is small. Hence, a single disk drive may be a performance bottleneck of the video server system if the same video data stored on that single disk drive are requested by various browsing clients at the same time.

From the system availability point of view, it is clear that the single storage system presents a single point of failure. If a problem disables the single storage system, then no video data from that system will be available. Similarly, storing video data on a single disk drive also presents a single point of failure. If a single disk drive is disabled, then the video data stored thereon are rendered unavailable.

Efforts have been made to attempt to overcome the problems associated with the single storage system mentioned above. For example, a method called redundant-arrays-of-inexpensive-disks (more commonly known as RAID) is a method used to store data on a group of disk drives so as to provide data redundancy. The basic premise of RAID is to store the same data on different disk drives within a disk drive group. By storing redundant data on different disk drives, data is available even if one of the disk drives in the disk drive group is disabled. RAID, therefore, helps resolve the problem of a single point of failure caused by storing data in a single disk drive.

RAID also provides improved performance with respect to data access. RAID 1 is a method used to make multiple copies of data onto different disk drives. In other words, each disk drive in the disk drive group has the same data. This is called data mirroring. When host computers read data stored on disk drives configured as RAID 1, one or more of the disk drives in the group are used to service the read requests in a parallel manner. By servicing the read requests from the host computers in parallel, the total data throughput is increased. Hence, the performance bottleneck caused by storing data on a single disk drive is alleviated.

There are generally two ways to implement RAID. First, RAID can be implemented in a storage system. The storage system generally includes a disk controller which manages groups of disk drives and determines how they are configured. The disk controller receives read requests from a host computer and determines how the read requests should be satisfied by the groups of disk drives in a balanced manner. That is, the disk controller performs a load balancing function so as to ensure that the groups of disk drives are utilized in an efficient manner.

Second, RAID can also be implemented in host computers. Each host computer generally includes a logical volume management system (LVMS) in its operating system. The LVMS performs the same functions as the storage system.

RAID in the storage system approach and RAID in the LVMS approach both solve the problems of a performance bottleneck and a single point of failure caused by storing data on a single disk drive. However, RAID in the storage system approach cannot be used to solve the problems of a performance bottleneck and a single point of failure caused by storing data in a single storage system. This is because RAID is limited to configuration within a single storage system itself. On the other hand, LVMS is not limited to a single storage system but can be applied to multiple storage systems. This means that LVMS can use disk drives in different storage systems as a group and can configure RAID 1 for a particular group.

FIG. 2 illustrates an example of disk mirroring configuration on multiple storage systems managed by LVMS. A group of two or more disk drives is defined as a pair. In this example, there are three pairs, Pair1, Pair2 and Pair3. Pair1 has three disk drives that are on three different storage systems. LVMS makes copies of the data, file A in this example, on to each disk drive in Pair1. To make the copies, LVMS issues the same data-write requests to each storage system at the same time. Similar to Pair1, Pair2 has two disk drives on two different storage systems. Pair3, on the other hand, is a different case. Pair3 has two disk drives which reside on the same storage system. This case is used solely for solving problems (2) and (4) identified above, namely, the performance bottleneck and the single point of failure caused by storing data on a single disk drive. Whether a system designer uses the case of Pair3 depends on a number of factors, such as, the availability of the storage system, how much money can be used for building the storage system, etc.

As described above, it seems that LVMS is able to solve problems (1) to (4) identified above. However, LVMS has two major problems. One of the problems is that issuing multiple data-write requests to storage systems causes a large CPU load on the host computers. For example, if there are ten disk drives to be mirrored, the host computers must then issue ten data-write requests at the same time. In contrast, in a system environment that has a single storage system and uses RAID in the storage system approach, data mirroring is processed by a disk controller in the storage system. The disk controller manages the data-write requests thereby reducing the CPU load of the host computers.

Another problem associated with LVMS is that there is no mechanism to distribute I/O requests among the multiple storage systems. Data mirroring configuration is independently managed by each host computer and each host computer does not know which disk drives may be currently used by other host computers. In a worst case scenario, all the host computers may end up using the same storage system at the same time although data are mirrored among multiple storage systems. Therefore, it would be desirable to develop a file sharing system which is capable of optimizing data access and providing other benefits.

SUMMARY OF THE INVENTION

A system for optimizing data access is provided. In one exemplary embodiment, the system includes a file server, one or more clients capable of communicating with the file server, and a plurality of disk drives organized into pairs for storing a plurality of files. Each pair includes a master disk drive and one or more mirrored disk drives, and each mirrored disk drive maintains a copy of data stored on the master disk drive. The file server maintains file information on where each of the plurality of files is stored on which pair of disk drives; and the file server further maintains access load information on each pair of disk drives. When a client requests file information for a requested file from the file server, the file server determines which pair of disk drives has the requested file and further determines which of the disk drives within the pair of disk drives having the requested file is to be accessed. The determination is done so as to balance the access load of the disk drives within the pair. The information pertaining to which disk drive should be accessed is then forwarded to the client thereby allowing the client to access the appropriate disk drive to retrieve the requested file.

Alternatively, the system may include a number of storage systems. A pair of disk drives may be spread across two or more storage systems, i.e., the master disk drive and the mirrored disk drives may reside on different storage systems respectively.

In one mode of operation where the master disk drive and the mirrored disk drives reside on different storage systems and the mirrored disk drives contain the latest copy of the data on the master disk drive, after obtaining information on the location of the needed file from the cluster file system server, the cluster file system client directly retrieves the needed file from the mirrored disk drive which is least frequently accessed.

In another mode of operation where the master disk drive and the mirrored disk drives reside on different storage systems and the mirrored disk drives do not contain the latest copy of the data on the master disk drive, after obtaining information on the location of the needed file from the cluster file system server, the cluster file system client contacts the pertinent storage system and attempts to retrieve the needed file from a mirrored disk drive which is least frequently accessed. When it is determined that the mirrored disk drive does not have the latest copy of the data on the master disk drive, the pertinent storage system retrieves the needed data from the master disk drive and forwards a copy of that data to the cluster file system client.

In another exemplary embodiment, a method for optimizing data access is provided. The method comprises: organizing a plurality of disk drives into pairs for storing a plurality of files, each pair having a master disk drive and one or more mirrored disk drives, and each mirrored disk drive having a copy of data stored on the master drive; maintaining file information on where each of the plurality of files is stored on which pair of disk drives; maintaining access load information on each pair of disk drives; upon receiving a request for a requested file, determining which pair of disk drives has the requested file by using the file information, and then determining which of the disk drives within the pair of disk drives having the requested file is to be accessed by using the access load information.

The present invention offers a number of advantages. For example, one advantage is that storage systems can accomplish data mirroring by themselves without LVMS support. When a disk controller in the storage system receives a data-write request from a host computer, the disk controller issues the same data-write request to different mirrored disk drives in the same pair. It is not limited to whether the disk drives are in the same storage system or in different storage systems. Therefore, CPU load of host computers can be reduced.

Another advantage is that a cluster file system is introduced to share files among host computers and one dedicated server aggregates disk I/O usage of mirrored disk drives in each pair and tells other host computers which mirrored disk drives the host computers should use thereby balancing the I/O load. This prevents the situation where multiple host computers concurrently utilize the same storage system or the same disk drive at the same time. Other advantages and benefits will become apparent upon studying the disclosure provided hereinbelow.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

BRIEF DESCRIPTION OF THE DRAWINGS

FIG. 1 is a simplified schematic diagram showing a typical system configuration where a single storage system containing video data is shared by multiple video servers;

FIG. 2 is a simplified schematic diagram illustrating an example of disk mirroring configuration on multiple storage systems managed by a logical volume management system;

FIG. 3 is a simplified schematic diagram illustrating a first exemplary embodiment of a system in accordance with the present invention;

FIG. 4 is a simplified schematic diagram illustrating a second exemplary embodiment of a system in accordance with the present invention;

FIG. 5 is a simplified diagram showing an example of a pair configuration table;

FIG. 6 is a simplified diagram showing an example of pairs;

FIG. 7 is a simplified diagram showing an example of a file allocation table;

FIG. 8 is a simplified diagram showing how a file is stored on a disk drive;

FIG. 9 is a simplified diagram showing an example of a pair usage table;

FIG. 10 is a flow diagram showing the process sequence of a CFS server;

FIG. 11 is an exemplary structure of a file allocation list that is returned from a CFS server to a CFS client after a file open is requested by the CFS client;

FIG. 12 is a diagram showing an exemplary structure of a file I/O request;

FIG. 13 is a diagram showing four types of file I/O request;

FIG. 14 is a flow diagram showing the process sequence of the CFS client;

FIG. 15 is a flow diagram showing the operation sequence of the File Open Module when called by the CFS client;

FIG. 16 is a diagram showing an example of a file management table;

FIG. 17 is a flow diagram showing the operation sequence of the File Write Module when called by the CFS client;

FIG. 18 is a diagram showing an exemplary format of a data I/O request;

FIG. 19 is a diagram showing two types of data I/O request;

FIG. 20 is a flow diagram showing the operation sequence of the File Read Module when called by the CFS client;

FIG. 21 is a flow diagram showing the operation sequence of the File Close Module when called by the CFS client;

FIG. 22 is a simplified diagram showing a synchronous data write sequence where mirrors are in the same storage system;

FIG. 23 is a simplified diagram showing an asynchronous data write sequence where mirrors are in the same storage system;

FIG. 24 is a simplified diagram showing a data read sequence where mirrors are in the same storage system (a case of synchronous data write or asynchronous data write and data is on mirror);

FIG. 25 is a simplified diagram showing a data read sequence where mirrors are in the same storage system (a case of asynchronous data write and data is not on mirror);

FIG. 26 is a simplified diagram showing a synchronous data write sequence where mirrors are on different storage systems;

FIG. 27 is a simplified diagram showing an asynchronous data write sequence where mirrors are on different storage systems;

FIG. 28 is a simplified diagram showing a data read sequence where mirrors are on different storage systems (a case of synchronous data write or asynchronous data write and data is on mirror);

FIG. 29 is a simplified diagram showing a data read sequence where mirrors are on different storage systems (a case of asynchronous data write and data is not on mirror);

FIG. 30 is a table showing relationships between FIGS. 22-29;

FIG. 31 is a diagram showing an example of a bitmap table;

FIG. 32 is a flow diagram showing the operation sequence of the I/O processor;

FIG. 33 is a flow diagram showing the operation sequence of the Data Write Module for a synchronous data write;

FIG. 34 is a flow diagram showing the operation sequence of the Data Write Module for an asynchronous data write;

FIG. 35 is a flow diagram showing the operation sequence of the Data Read Module for a synchronous write;

FIG. 36 is a flow diagram showing the operation sequence of the Data Read Module for an asynchronous write;

FIG. 37 is a flow diagram showing the operation sequence of the sync daemon;

FIG. 38 is a flow diagram showing the operation sequence of the Check Invalid Module; and FIG. 39 is a simplified schematic diagram showing an embodiment of a storage system.

DETAILED DESCRIPTION OF THE INVENTION

Various embodiments of the present invention will now be described. FIG. 3 and FIG. 4 are simplified schematic diagrams illustrating two exemplary embodiments of a system 10 in accordance with the present invention. FIG. 3 illustrates a first exemplary embodiment of the system 10 which includes a single storage system 12. FIG. 4 illustrates a second exemplary of the system 10 which includes multiple storage systems 14a, 14b and 14c. Referring to FIGS. 3 and 4, the system 10 further includes multiple host computers 16a, 16b and 16c.

Focusing on FIG. 3, each host computer 16 further includes one or more applications 18 and a cluster file system 20. The applications 18 may include, for example, a video server running on the host computer 16. The applications 18 may retrieve data through the cluster file system 20. The cluster file system 20 typically resides in the operating system of the host computer 16.

One of the functions of the cluster file system 20 is to coordinate data sharing amongst the host computers 16. The cluster file system 20 further includes two components, namely, a CFS server and a number of CFS clients. The CFS server is a dedicated server that manages and controls meta-data information of a file system. In addition, as will be further explained below, the CFS server performs load balancing of data I/O. The CFS client performs file I/O requests from an application 18. The CFS client communicates with the CFS server to get file allocation lists that show where files are stored on the disk drives within the storage system 12. As shown in FIG. 3, host computer 16a includes a CFS server and host computers 16b and 16c include two CFS clients respectively.

Also shown in FIG. 3, the single storage system 12 includes one disk controller and multiple physical disk drives. However, it should be understood that each storage system 12 or 14 may include more than one disk controller. It should be further understood that while the storage system 12 or 14 is described herein as having disk drives, the storage system 12 or 14 may include other types of storage elements, such as, CD-ROM drives, DVD drives, or other appropriate storage elements.

The disk controller further includes two components. One is an I/O processor and the other is a sync daemon. The I/O processor processes data I/O requests from host computers 16 and the sync daemon performs functions relating to data mirroring.

A pair is defined as a group of disk drives which represents a data mirroring unit. One of the disk drives within a pair is called a master disk drive and the others are called mirrored disk drives. Host computers 16 and storage system 12 share information as to which pairs have which disk drives. A disk drive is specified by an ID of the storage system 12 and an ID of a disk drive in the storage system 12. They are called SS ID and Vol ID respectively. A pair configuration table is used to maintain the ID information of each pair. FIG. 5 is an example of the pair configuration table.

Referring to FIG. 5, in the pair configuration table, a pair is identified by a name, such as, Pair1 and Pair2. Each pair has one master disk drive and one or more mirrored disk drives. As mentioned above, the disk drives are specified by SS ID and Vol ID.

FIG. 6 shows an example of pairs. In FIG. 6, Pair1 includes three disk drives. Its master disk drive is a disk drive that has Vol ID 8 and resides in the storage system that has SS ID=1. The two mirrored disk drives reside in different storage systems, storage system SS ID=2 and storage system SS ID=3. Similarly, Pair2 includes two disk drives. As shown in FIG. 6, the master disk drive and the mirrored disk drive of Pair2 can be in the same storage system, storage system SS ID=1.

Alternatively, mirrored disk drives can be identified by a mirror number. If a host computer 16 knows a pair name and a mirror number, it can determine the mirrored disk drive by using that information and the pair configuration table. For example, a disk drive that is in Pair1 and has a mirror number 2 is a disk drive with Vol ID 5 in a storage system with SS ID=3. Note that mirror number 0 indicates a master disk drive.

The cluster file system 20 will now be further described. The cluster file system 20 includes one CFS server and one or more CFS clients. One host computer 16 generally has either CFS server capability or CFS client capability. However, it should be understood that a host computer 16 can also have both CFS server capability and CFS client capability at the same time.

The CFS server manages and controls meta-data information of a file system. Typical file system has a bitmap table and inode information as the meta-data. The bitmap table shows which clusters in the disk drives have already been allocated for storing files and which clusters are available to store files in the future. The inode information shows locations of files on the disk drives and attributes of the files.

The CFS server maintains a file allocation table. FIG. 7 shows an example of the file allocation table in a file system. A file is specified by its name. A file is a set of data stored on disk drives. One unit of data is called a block. A block is a unit of data that is allocated in a disk drive. A file is made up of one or more blocks. FIG. 8 illustrates how a file and its constituent blocks are stored on a disk drive. Blocks are identified by its number, block #1, block #2, and so on.

Data in each block is stored on a disk drive as shown in FIG. 8. An address space of a disk drive starts from 0 and ends at a size of the disk drive. When data is stored on a disk drive, an offset from a start address 0 and its size are specified. For example, block #1 of File1 in FIG. 8 is stored at an offset 100 of the disk drive. The size of a block is fixed but can be changed depending on file system configuration.

The file allocation table has information about a file name and its location. The location is identified by a list of blocks. The block is identified by a disk drive and an offset. Referring to FIG. 7, Block #1 of File1 is stored at an offset 100 of a disk drive that has Vol ID 8 and is in a storage system that has SS ID=1. When a particular file is needed, a CFS client requests the CFS server to return a file allocation list of that needed file from the file allocation table. The CFS client can then perform read and write operations relating to that file using the returned file allocation list.

The CFS server maintains other information about which disk drives are busy and which disk drives are not busy. Before CFS clients start using files, they first ask the CFS server to return the needed file allocation lists. Hence, the CFS server stands in a good position to gather CFS client activities. As a result, the CFS server can perform proper load balancing amongst the various disk drives.

For example, when the CFS server receives a file open request from a CFS client, it selects the least used mirrored disk drive where the requested file is stored. The CFS server then increments the number of file opens on the selected mirrored disk drive.

The CFS server captures information on the CFS client activities. Such information is stored in a pair usage table. FIG. 9 shows an example of the pair usage table. As shown in FIG. 9, for example, regarding Pair1, there are 100 file opens on its master disk drive, 200 file opens on the mirrored disk drive #1 and 50 file opens on the mirrored disk drive #2. The numbers show how busy the various disk drives within each group are. In this example, the mirrored disk drive #2 is the least used disk drive in Pair1.

The process sequence of the CFS server will now be described. FIG. 10 shows how the CFS server operates. After the CFS server is initiated, it waits for a request from the CFS clients. Typically, there are two kinds of requests, file open and file close.

In the case of file open, the CFS server determines the pair name of the pair where the requested file is stored by using the file allocation table. Using the pair usage table, the CFS server then determines which disk drive in the pair is currently the least used. After that, the CFS server sends a file allocation list of the requested file with the mirror number of the least used disk drive to the requesting CFS client. Finally, the CFS server updates the pair usage table by incrementing the number of file opens on the least used disk drive.

FIG. 11 is an exemplary structure of a file allocation list that is returned from the CFS server to the CFS client after a file open is requested by the CFS client. As shown in FIG. 11, the file allocation list includes $mirror_{13}$ num, $block_{13}$ num and $block_{13}$ list. The $mirror_{13}$ num shows which mirrored disk drive in the pair the CFS client should use, the $block_{13}$ num shows the number of blocks which make up the file and the $block_{13}$ list is a list of the blocks which make up the requested file.

In the case of file close, the CFS server simply decrements the number of file opens on the disk drive specified by a mirror number specified in a file close request from a CFS client. The CFS server then returns a reply to the CFS client to indicate that the file close request has been completed.

The process sequence of the CFS client will now be described. An application communicates with the CFS client by using a file I/O request. When data is needed by the application, the appropriate file I/O request is issued by the application to the CFS client. FIG. 12 shows an exemplary structure of the file I/O request. There are four types of file I/O requests which can be issued by an application, namely, file open, file write, file read and file close. FIG. 13 shows the four types of file I/O requests, $File_{13}$ Open, $File_{13}$ Write, $File_{13}$ Read and $File_{13}$ Close. Depending on the type, the exemplary structure of the file I/O request as shown in FIG. 12 may change.

In the case of file open, the file I/O request includes the file name of the file to be opened and some additional information like a mode. The mode is used to indicate the file open type like, read-only open, read and write open and so on. After completion of a file open, the CFS client returns a file ID for this file open to the requesting application.

In the case of file write, the file I/O request includes a file ID, an offset at which data is stored, size of data stored, and the data itself. It should be noted that the offset provided in the file I/O request is not an offset on the disk drive address space but an offset on a file.

In the case of file read, the file I/O request includes a file ID, an offset from which an application wants to read the data, size of data, and a buffer address of the application in which the read data are to be stored.

In the case of file close, the file I/O request includes a file ID only.

FIG. 14 shows how the CFS client operates. The CFS client performs four tasks depending on the type of file I/O request. For each type, the CFS client calls a corresponding module, File Open Module for $File_{13}$ Open, File Write Module for $File_{13}$ Write, File Read Module for $File_{13}$ Read and File Close Module for $File_{13}$ Close. If the type does not belong to any one of the four types, the CFS client returns a file I/O error to the application.

FIG. 15 shows the operation sequence of the File Open Module when called by the CFS client. This module sends a file open request to the CFS server to get a file allocation list. This request specifies the file name of the requested file. After the CFS client receives the file allocation list, it keeps the information in a file management table as shown in FIG. 16. The file management table is a list of file allocation lists and each element is identified by an index called a file ID. This file ID is also associated with the file open request. This module eventually returns the file ID to the requesting application.

FIG. 17 shows the operation sequence of the File Write Module when called by the CFS client. The file I/O request from an application has a file ID, an offset and a data size. The file ID, offset and data size are used to identify the block number where the data is to be written by using its file allocation list. Depending on the size of the data, the number of blocks that are needed to store the data may be more than one. This module then identifies SS ID and Vol ID of the master disk drive from the file allocation list. It should be noted that a pair includes one master disk drive and one or more mirrored disk drives and data are always written on to the master disk drive and the written data are then copied to all the mirrored disk drives by the disk controller in the storage system. After that, this module makes a data I/O request that will be issued to the storage system with the SS ID. An exemplary format of a data I/O request is shown in FIG. 18. This has a type of data I/O requests, Vol ID in the storage system, an offset from the beginning of the disk drive Vol ID, the size of data to be written and the data itself. There are two types of data I/O requests, $Data_{13}$ Read and $Data_{13}$ Write, as shown in FIG. 19. The offset comes from the block number and the file allocation list. This module then sends the data I/O request to the storage system and receives a result of the data write. Finally, this module returns the result to the requesting application.

FIG. 20 shows the operation sequence of the File Read Module when called by the CFS client. This file I/O request from an application has a file ID, an offset, a size and a buffer address. They identify a block number from which data is to be read by using its file allocation list. By referring to the pair configuration table, this module identifies SS ID and Vol ID of a mirrored disk drive that has a mirror number indicated in the file allocation list. Which mirrored disk drive is used is determined by the CFS server. It should be noted again that the mirror number 0 indicates the master disk drive. After that, this module makes a data I/O request that will be issued to the storage system with the SS ID. This module then sends the data I/O request to the storage system and receives a result of the data read. Finally, this module copies the received data into a buffer specified by the requesting application and then returns the result to the application.

FIG. 21 shows the operation sequence of the File Close Module when called by CFS client. This module sends a file close request to the CFS server with the mirror number in the file allocation list. After a reply is received from the CFS server, this module deletes an entry of the file allocation list from the file management table. Finally, this module returns a reply to the requesting application.

How the storage systems work and how they make copies of data will now be described. The storage systems make copies of the data. To do that, the storage systems send a received data-write request to other disk drives in the same pair. At this point, each storage system has two options. One is before the data-write request is executed, the storage system returns a completion of I/O request to a host computer. This is called synchronous data write. The other is after the data-write request is executed, the storage system returns a completion of I/O request to a host computer. This is called asynchronous data write.

In the asynchronous data write case, there is a situation in which the CFS server tells the CFS client to read data from some mirrored disk drive but the latest written data has not been yet copied from the master disk drive to the mirrored disk drives. In this situation, the disk controller that receives the read request gets the latest data from the master disk drive and returns the read data to the host computer.

The data write and data read sequences are illustrated graphically in FIGS. 22-29. FIGS. 22, 23, 24, 25, 26, 27, 28 and 29 show interactions between host computers and storage systems. Ten cases caused by the following differences will be considered.

(1) Synchronous data write or asynchronous data write
(2) Data is on the mirrored disk drive or not when read request to the mirrored disk drive has been issued
(3) Disk drives in a pair are in the same storage systems or different storage systems
(4) Data I/O request is to write data or to read data FIG. 30 shows the relationships between FIGS. 22-29 and cases caused by the above situations. FIG. 22 illustrates a case with the following conditions:
 (a) synchronous data write;
 (b) a pair is on the same storage system; and
 (c) a host computer requests data write.

(Steps 1, 2 and 3) The CFS client in the host computer gets a file allocation list from the CFS server. The CFS client then issues a data write request to the storage system that has the master disk drive of the pair where the requested file resides. The I/O processor receives the request and writes the data to the master disk drive. (Step 4) At the same time, the I/O processor writes the same data to the mirrored disk drives in the pair. After that, the I/O processor returns a completion of I/O to the host computer.

FIG. 23 illustrates a case with the following conditions:
(a) asynchronous data write;
(b) a pair is on the same storage system; and
(c) a host computer requests data write.

(Steps 1 and 2) The CFS client in the host computer gets a file allocation list from the CFS server. The CFS client then issues a data write request to the storage system that has the master disk drive of the pair where the requested file resides. (Step 3) The I/O processor receives the request and writes the data to the master disk drive. After that, the I/O processor returns a completion of I/O to the host computer. (Step 4) The written data is copied to the mirrored disk drives in the pair by sync daemon asynchronously.

FIG. 24 illustrates a case with the following conditions:
(a) synchronous data write;
(b) a pair is on the same storage system; and
(c) a host computer requests data read.

OR (a) asynchronous data write;
(b) a pair is on the same storage system;
(c) a host computer requests data read; and
(d) the data is on the mirrored disk drive.

(Steps 1, 2 and 3) The CFS client in the host computer gets a file allocation list from the CFS server. The CFS client then issues a data read request to the storage system that has the mirrored disk drive of the pair where the requested file resides. The I/O processor receives the request and reads the requested data from the mirrored disk drive. (Step 4) After that, the I/O processor returns the read data and a completion of I/O to the host computer.

FIG. 25 illustrates a case with the following conditions:
(a) asynchronous data write;
(b) a pair is on the same storage system;
(c) a host computer requests data read; and
(d) the data is NOT on the mirrored disk drive.

(Steps 1, 2 and 3) The CFS client in the host computer gets a file allocation list from the CFS server. The CFS client then issues a data read request to the storage system that has the mirrored disk drive of the pair where the requested file resides. (Step 4) The I/O processor receives the request and finds the mirrored disk drive does not have the latest data so it reads the requested data from the master disk drive on the pair. (Step 5) After that, the I/O processor returns the read data and a completion of I/O to the host computer.

FIG. 26 illustrates a case with the following conditions:
(a) synchronous data write;
(b) a pair is on different storage systems; and
(c) a host computer requests data write.

(Steps 1, 2 and 3) The CFS client in the host computer gets a file allocation list from the CFS server. The CFS client then issues a data write request to the storage system that has the master disk drive of the pair where the requested file resides. The I/O processor receives the request and writes the data to the master disk drive. (Step 4) At the same time, the I/O processor writes the same data to each mirrored disk drive in the pair through a communication path to the different storage systems. After that, the I/O processor returns a completion of I/O to the host computer.

FIG. 27 illustrates a case with the following conditions:
(a) asynchronous data write;
(b) a pair is on different storage systems; and
(c) a host computer requests data write.

(Steps 1 and 2) The CFS client in the host computer gets a file allocation list from the CFS server. The CFS client then issues a data write request to the storage system that has the master disk drive of the pair where the requested file resides. (Step 3) The I/O processor receives the request and writes the data to the master disk drive. After that, the I/O processor returns a completion of I/O to the host computer. (Step 4) The written data is copied to each mirrored disk drive in the pair through a communication path to the different storage systems by the sync daemon asynchronously.

FIG. 28 illustrates a case with the following conditions:
(a) synchronous data write;
(b) a pair is on different storage systems; and
(c) a host computer requests data read.

OR (a) asynchronous data write;
(b) a pair is on different storage systems;
(c) a host computer requests data read; and
(d) the data is on the mirrored disk drive.

(Steps 1 and 2) The CFS client in the host computer gets a file allocation list from the CFS server. The CFS client then issues a data read request to the storage system that has the mirrored disk drive of the pair in where the requested file resides. (Step 3) The I/O processor receives the request and reads the requested data from the mirrored disk drive. (Step 4) After that, the I/O processor returns the read data and a completion of I/O to the host computer.

FIG. 29 illustrates a case with the following conditions:
(a) asynchronous data write;
(b) a pair is on different storage systems;
(c) a host computer requests data read; and
(d) the data is NOT on the mirrored disk drive.

(Steps 1 and 2) The CFS client in the host computer gets a file allocation list from the CFS server. The CFS client then issues a data read request to the storage system that has the mirrored disk drive of the pair where the requested file resides. (Steps 3 and 4) The I/O processor receives the request and finds that the mirrored disk drive does not have the latest data so it reads the requested data from the master disk drive on the pair through a communication path to the different storage systems. (Step 5) After that, the I/O processor returns the read data and a completion of I/O to the host computer.

Other components of the storage system 12 will now be described. A sync daemon in a storage system manages a bitmap table which shows which clusters in the mirrored disk drives contain valid and invalid data. Invalid data means that data in a cluster of the master disk drive has not yet been copied to the corresponding cluster of the mirrored disk drive. Cluster is a unit of data to be copied by the sync daemon. An address space of a disk drive is divided by the size of the cluster. The size of the cluster may be same as that of the block or one cluster may includes multiple blocks depending on system design. A cluster is ordered by the number, cluster #1, cluster #2, and so on.

FIG. 31 shows an example of the bitmap table. This example shows there are two pairs, namely, Pair1 and Pair2, and Pair1 has two mirrored disk drives. As described above, the disk drives are identified by SS ID and Vol ID. Cluster #1 of the mirrored disk drive 1 of Pair1 is Valid in this table.

This means that cluster #1 of the mirrored disk drive 1 has the same data as the corresponding cluster of the master disk drive. On the other hand, cluster #2 of the mirrored disk drive 1 of Pair1 is Invalid in this table. This means data in cluster #2 of the master disk drive has not yet been copied to cluster #2 of the mirrored disk drive 1. By examining the bitmap table, the sync daemon can detect any data inconsistency between the master disk drive and its mirrored disk drives and accordingly copy data from the master disk drive to the appropriate mirrored disk drives.

Typically, a disk controller in a storage system is a computer composed of processors, memory and I/O controllers. The disk controller performs, amongst other functions, two types of tasks, namely, running the I/O processor and the sync daemon. These tasks are described below.

The I/O processor processes a data I/O request from a host computer. When the I/O processor receives a data I/O request as shown in FIG. 18, it calls a corresponding module, Data Write Module or Data Read Module, depending on the type of the data I/O request. If the type is neither Data$_{13}$ Read nor Data$_{13}$ Write, it returns a data I/O error to the host computer. FIG. 32 shows the operation sequence of the I/O processor.

FIG. 33 shows the operation sequence of the Data Write Module for a synchronous data write. This module is called by the I/O processor. This module writes data at the offset of the disk drive. The data, the offset and Vol ID of the disk drive are specified in the data I/O request. If the disk drive is in some pair, this module sends the same data I/O request to each mirrored disk drive in the pair. If some mirrored disk drives are in different storage systems, this module sends the requests through a communication path to the appropriate storage systems. The module then sends a reply to the host computer. If the disk drive is not in any pair, this module simply sends a reply to the host computer.

FIG. 34 shows the operation sequence of the Data Write Module for an asynchronous data write. This is called by the I/O processor. This module writes data at the offset of the disk drive. The data, the offset and Vol ID of disk drive are specified in the data I/O request. If the disk drive is in some pair, this module sets an invalid flag to the corresponding cluster number of all the mirrored disk drives in the pair. The module then sends a reply to the host computer. If the disk drive is not in any pair, this module simply sends a reply to the host computer.

FIG. 35 shows the operation sequence of the Data Read Module for a synchronous data write. This is called by the I/O processor. This module reads data at the offset of the disk drive. The offset and Vol ID of the disk drive are specified in the data I/O request. The read data is then sent to the host computer. In the synchronous data write case, all the mirrored disk drives have the latest data at any time.

FIG. 36 shows the operation sequence of the Data Read Module for an asynchronous data write. This is called by the I/O processor. This module checks if the disk drive specified in the data I/O request is in a pair. If it is, this module sends a check invalid request to the storage system that has the master disk drive of the pair. This storage system can be the same storage system or a different storage system. If a reply from the storage system does not show invalid (in other words, data in the mirrored disk drive is the latest), this module simply reads data at the offset of the disk drive specified by the data I/O request. Finally, the module sends the read data to the host computer. If the reply from the storage system shows invalid, this module sends data in the reply to the host computer. Note that the storage system that has the master disk drive transmits the latest data in the reply. If the disk drive is not in any pair, this module simply reads data at the offset of the disk drive specified by the data I/O request. Finally, the module sends the read data to the host computer.

The sync daemon works in a case of asynchronous data write to copy the latest data on the master disk drive to all the mirrored disk drives in the pair. FIG. 37 shows a process sequence of the sync daemon. When sync daemon is initiated, it checks to determine if there is any check invalid request from the I/O processor. If there is, it calls the Check Invalid Module. If there is no check invalid request, the sync daemon then checks to determine if there is any cluster that has an invalid flag in the bitmap table. If there is such a cluster, the sync daemon reads data in the corresponding cluster of the master disk drive and then writes it to each mirrored disk drive in the same pair. If some mirrored disk drives are in different storage systems, the sync daemon uses a communication path to communicate with the appropriate storage systems to write the data.

FIG. 38 shows the operation sequence of the Check Invalid Module when called by the sync daemon. If it is called, it checks to determine if there is an invalid flag in the corresponding cluster of the specified mirrored disk drive in the bitmap table. If there is no invalid flag, it simply returns a reply with a valid flag to the requesting I/O processor. If the I/O processor is in a storage system different from the sync daemon, this module uses a communication path to communicate with the appropriate storage system to send the reply. If the cluster is invalid, i.e. there is an invalid flag, this module reads the latest data in the same cluster in the master disk drive and then sends a reply with the read data and an invalid flag to the I/O processor. The I/O processor uses this data to respond to the data I/O request from the host computer.

As shown in FIG. 39, the storage system 12 may have a cache memory. With a cache memory available, data need not be written on to a disk drive immediately. Instead, data is first written to and stored in the cache memory. Data stored in the cache memory is written to the disk drives asynchronously. Caching data increases the write performance of the storage system 12 because typically writing data to a disk drive takes 10 to 20 milliseconds. On the other hand, writing data to the cache memory usually takes 10 to 100 microseconds.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A system for optimizing data access, comprising:
   a file server capable of communicating with one or more clients; and
   a plurality of storage elements organized into pairs for storing a plurality of files, each pair having a master storage element and at least one mirrored storage element, and each mirrored storage element being configured to receive a copy of data stored on the master storage element;
   wherein the file server maintains file information on where each of the plurality of files is stored on which pair of storage elements, and maintains access load information regarding each one of the pair of storage elements;

wherein when a client requests access to file information for a requested file, the file server determines a pair of storage elements for accessing the requested file, and returns to the client a first identifier of a storage element within the pair of storage elements that is to be accessed for reading data, and a second identifier of the master storage element of the pair of storage elements that is to be accessed for writing data, the determination being based upon use of storage elements within the system, wherein the client initiates I/O operations with the pair of storage elements absent the file server, wherein write operations by the client are made using the first identifier and read operations by the client are made using the second identifier, and wherein data written to the master storage element is copied to the at least one mirrored storage element within each pair of storage elements.

2. The system according to claim 1 wherein the plurality of storage elements is a plurality of disk drives.

3. The system according to claim 1 wherein the plurality of storage elements are provided in a single storage system.

4. The system according to claim 1 wherein the plurality of storage elements are provided in at least two storage systems.

5. The system according to claim 1 further comprising:
a plurality of host computers;
wherein the file server resides on one of the plurality of host computers; and
wherein the one or more clients reside on remaining ones of the plurality of host computers.

6. The system according to claim 1 further comprising an apparatus configured to synchronize data stored on each pair of storage elements.

7. The system according to claim 1 wherein the master storage element and the at least one storage element within a pair are contained in a single storage system.

8. The system according to claim 1 wherein if it is determined that a mirrored storage element is to be accessed for the requested file and the mirrored storage element which is to be accessed contains a latest copy of data for the requested file stored on the corresponding master storage element, the client directly retrieves the requested file from the mirrored storage element.

9. The system according to claim 8 wherein if it is determined that a mirrored storage element is to be accessed for the requested file and the mirrored storage element which is to be accessed does not contain a latest copy of data for the requested file stored on the corresponding master storage element, the latest copy of data for the requested file stored on the corresponding master storage element is retrieved from the corresponding master storage element and then forwarded to the client.

10. The system according to claim 1 wherein the file information on where each of the plurality of files is stored on which pair of storage elements includes file allocation lists.

11. The system according to claim 1 wherein when determining which of the storage elements within the pair of storage elements having the requested file is to be accessed, consideration is given to ensure that all the storage elements within the pair of storage elements having the requested file are accessed in a substantially balanced manner.

12. The system according to claim 1 wherein upon determining which of the storage elements within the pair of storage elements having the requested file is to be accessed, the file server forwards a file allocation list for the requested file to the client thereby allowing the client to retrieve the requested file from the determined storage element.

13. The system according to claim 12 wherein upon forwarding the file allocation list to the client, the file server updates the access load information to ensure accurate monitoring of access balance of the pairs.

14. A system for optimizing data access comprising:
a first host computer having a file system server, the first host computer capable of communicating with a second host computer having a file system client;
a storage system having a plurality of disk drives organized into pairs for storing a plurality of files, each pair having a master disk drive and at least one mirrored disk drive, each mirrored disk drive being configured to receive a copy of data stored on the master disk drive;
wherein the file system server maintains file information on where each of the plurality of files is stored on each pair of disk drives and further maintains access load information on each pair of disk drives;
wherein when a file system client requests access to file information for a requested file, the file server determines a pair of storage elements for accessing the requested file, and returns to the file system client a first identifier of a storage element within the pair of storage elements that is to be accessed for reading data, and a second identifier of the master storage element of the pair of storage elements that is to be accessed for writing data, the determination being based upon use of storage elements within the system,
wherein the file system client, absent the file system server, initiates I/O operations with the identified disk drive to access the requested file,
wherein write operations by the file system client are made using the first identifier and read operations by the file system client are made using the second identifier, and
wherein data written to the master storage element is copied to the at least one mirrored storage element within each pair of storage elements.

15. The system according to claim 14 wherein the file information on where each of the plurality of files is stored on which pair of disk drives includes file allocation lists.

16. The system according to claim 14 wherein when determining which of the disk drives within the pair of disk drives having the requested file is to be accessed, consideration is given to ensure that all the disk drives within the pair of disk drives having the requested file are accessed in a substantially balanced manner.

17. The system according to claim 14 wherein upon determining which of the disk drives within the pair of disk drives having the requested file is to be accessed, the file system server forwards a file allocation list for the requested file to the file system client thereby allowing the file system client to retrieve the requested file from the determined disk drive.

18. The system according to claim 17 wherein upon forwarding the file allocation list to the file system client, the file system server updates the access load information to ensure accurate monitoring of access balance of the pairs.

19. A system for optimizing data access comprising:
a first host computer having a file system server, the first host computer capable of communicating with a second host computer having a file system client;
a plurality of storage systems, each of the plurality of storage systems having a plurality of disk drives, the plurality of disk drives from the plurality of storage systems being collectively organized into pairs for storing a plurality of files, each pair having a master disk drive and at least one mirrored disk drive, each mirrored disk drive being configured to receive a copy of data stored on the master disk drive;

wherein the file system server maintains file information on where each of the plurality of files is stored on which pair of disk drives and further maintains access load information on each pair of disk drives;

wherein when a file system client requests access to file information for a requested file, the file server determines a pair of storage elements for accessing the requested file, and returns to the file system client a first identifier of a storage element within the pair of storage elements that is to be accessed for reading data, and a second identifier of the master storage element of the pair of storage elements that is to be accessed for writing data, the determination being based upon use of storage elements within the system, wherein the file system client, absent the file system server, initiates I/O operations with the identified disk drive to access the requested file, wherein write operations by the file system client are made using the first identifier and read operations by the file system client are made using the second identifier, and wherein data written to the master storage element is copied to the at least one mirrored storage element within each pair of storage elements.

20. The system according to claim 19 wherein the file information on where each of the plurality of files is stored on which pair of disk drives includes file allocation lists.

21. The system according to claim 19 wherein when determining which of the disk drives within the pair of disk drives having the requested file is to be accessed, consideration is given to ensure that all the disk drives within the pair of disk drives having the requested file are accessed in a substantially balanced manner.

22. The system according to claim 19 wherein upon determining which of the disk drives within the pair of disk drives having the requested file is to be accessed, the file system server forwards a file allocation list for the requested file to the file system client thereby allowing the file system client to retrieve the requested file from the determined disk drive.

23. The system according to claim 22 wherein upon forwarding the file allocation list to the file system client, the file system server updates the access load information to ensure accurate monitoring of access balance of the pairs.

24. The system according to claim 19 wherein if it is determined that a mirrored disk drive is to be accessed for the requested file and the mirrored disk drive which is to be accessed contains a latest copy of data for the requested file stored on the corresponding master disk drive, the file system client directly retrieves the requested file from the mirrored disk drive.

25. The system according to claim 19 wherein if it is determined that a mirrored disk drive is to be accessed for the requested file and the mirrored disk drive which is to be accessed does not contain a latest copy of data for the requested file stored on the corresponding master disk drive, the latest copy of data for the requested file stored on the corresponding master disk drive is retrieved from the corresponding master disk drive and then forwarded to the file system client.

26. A method for optimizing data access comprising:

organizing a plurality of storage elements into pairs for storing a plurality of files, each pair having a master storage element and at least one mirrored storage elements, each mirrored storage element being configured to receive a copy of data stored on the master storage element;

maintaining file information on where each of the plurality of files is stored on each pair of storage elements;

maintaining access load information on each one of the pair of storage elements;

upon receiving a request for a requested file, determining a pair of storage elements for accessing the requested file, returning file access information including a first identifier of a storage element within the pair of storage elements that is to be accessed for reading data, and a second identifier of the master storage of the pair of storage elements that is to be accessed for writing data, the first identifier being selected based upon use of the storage elements, wherein said file access information is returned to a client thereby allowing the client to retrieve the requested file absent a file server, wherein write operations by the client are made using the first identifier and read operations by the client are made using the second identifier, and wherein data written to the master storage element is copied to the at least one mirrored storage element within each pair of storage elements.

27. The method of claim 26 further comprising upon returning file access information to the client, updating the access load information to ensure accurate monitoring of access balance of the pairs.

28. The method according to claim 26 wherein the plurality of storage elements are stored on a single storage system.

29. The method according to claim 26 wherein the plurality of storage elements are stored in at least one storage system.

30. The method according to claim 29 further comprising upon determining that a mirrored storage element is to be accessed for the requested file and the mirrored storage element which is to be accessed contains a latest copy of data for the requested file stored on the corresponding master storage element, retrieving the requested file from the mirrored storage element directly.

31. The method according to claim 29 further comprising upon determining that a mirrored storage element is to be accessed for the requested file and the mirrored storage element which is to be accessed does not contain a latest copy of data for the requested file stored on the corresponding master storage element, retrieving the latest copy of data for the requested file stored on the corresponding master storage element from the corresponding master storage element.

32. The method according to claim 26 wherein when determining which of the storage elements within the pair of storage elements having the requested file is to be accessed, consideration is given to ensure that all the storage elements within the pair of storage elements having the requested file are substantially accessed in a balanced manner.

33. The method according to claim 26 wherein the plurality of storage elements includes a plurality of disk drives.

34. A method for optimizing data access between a file server and at least one or more clients comprising:

organizing a plurality of disk drives into pairs for storing a plurality of files, each pair having a master disk drive and at least one mirrored disk drive, and each mirrored disk drive being configured to receive a copy of data stored on the master drive;

maintaining file information on where each of the plurality of files is stored on which pair of disk drives;

maintaining access load information on each pair of disk drives, wherein the file information and the access load information are maintained at the file server;

upon receiving a request for a requested file, determining a pair of storage elements for accessing the requested file based upon a usage level of its corresponding storage elements, and forwarding to the client a first identifier of a storage element within the pair of storage elements that is to be accessed for reading data, and a second identifier of the master storage within the pair of storage elements for writing data thereby allowing the client to initiate I/O operations, absent the file server, to access the requested file.

* * * * *